(12) United States Patent
Wolkov et al.

(10) Patent No.: US 11,904,923 B2
(45) Date of Patent: Feb. 20, 2024

(54) CART

(71) Applicant: Ryankart, LLC, Woodland Hills, CA (US)

(72) Inventors: Ryan M. Wolkov, Woodland Hills, CA (US); Edward Nowak, Woodland Hills, MI (US)

(73) Assignee: RyanKart, LLC, Woodland Hills, CA (US)

(*) Notice: Subject to any disclaimer, the term of this patent is extended or adjusted under 35 U.S.C. 154(b) by 0 days.

(21) Appl. No.: 17/615,191

(22) PCT Filed: May 29, 2020

(86) PCT No.: PCT/US2020/000020
§ 371 (c)(1),
(2) Date: Nov. 30, 2021

(87) PCT Pub. No.: WO2020/242536
PCT Pub. Date: Dec. 3, 2020

(65) Prior Publication Data
US 2022/0227406 A1    Jul. 21, 2022

Related U.S. Application Data

(60) Provisional application No. 63/100,283, filed on Mar. 6, 2020, provisional application No. 62/854,835, filed on May 30, 2019.

(51) Int. Cl.
*B62B 3/18*    (2006.01)
*B62B 5/06*    (2006.01)

(52) U.S. Cl.
CPC ............... *B62B 3/18* (2013.01); *B62B 5/066* (2013.01)

(58) Field of Classification Search
CPC ............ B62B 3/18; B62B 3/14; B62B 3/1492
See application file for complete search history.

(56) References Cited

U.S. PATENT DOCUMENTS

| 3,437,176 A | * | 4/1969 | Ruttenberg | ............... E04H 3/04 |
| | | | | 280/33.993 |
| 5,836,596 A | * | 11/1998 | Wanzl | ...................... B62B 3/18 |
| | | | | 280/33.991 |
| 8,814,199 B2 | * | 8/2014 | Shindelar | ................ B62B 1/002 |
| | | | | 280/651 |
| 9,321,473 B2 | * | 4/2016 | Kiser, III | .................. B62B 3/02 |
| 2010/0276899 A1 | * | 11/2010 | Burdwood | ............ B62B 3/1468 |
| | | | | 280/33.991 |
| 2012/0211956 A1 | * | 8/2012 | Chen | ...................... B62B 3/001 |
| | | | | 280/47.34 |

(Continued)

*Primary Examiner* — Brian L Swenson
(74) *Attorney, Agent, or Firm* — Harness, Dickey & Pierce, P.L.C.

(57) ABSTRACT

A wheeled, pushable cart for transporting cargo that when not in use can be stacked or nested in telescoping fashion, and which can be used with carts having a base frame to which the wheels are attached, and various components, which can include one or more baskets, that are attached to the base frame. The manner in which the wheels are attached and arranged, and the orientation of the base frame, provide for increased storage and ease of access to the base frame and bottom shelf from the rear of the cart, and easy nesting (also referred to as stacking) of multiple carts in telescoping fashion when the carts are not in use.

12 Claims, 49 Drawing Sheets

(56) References Cited

U.S. PATENT DOCUMENTS

| | | | |
|---|---|---|---|
| 2014/0159327 A1* | 6/2014 | Smith | B62B 3/14 |
| | | | 280/33.991 |
| 2015/0053652 A1* | 2/2015 | Peters | B23K 11/0026 |
| | | | 219/78.16 |
| 2020/0216105 A1* | 7/2020 | McMurtrey | B62B 3/002 |

* cited by examiner

CART

RELATED PROVISIONAL APPLICATIONS

This application is a 371 U.S. National Stage of International Application No. PCT/US2020/000020, filed May 29, 2020, which claims prioirty to provisional patent application No. 62/854,835, filed May 30, 2019, and provisional patent applicaton No. 63/100,283, filed Mar. 6, 2020. The entire discosures of the above applications are incrporated herein by reference.

FIELD OF THE INVENTION

The inventions herein described, depicted and claimed relate generally to carts used to carry cargo; specifically to pushable wheeled carts, and more specifically to wheeled carts that may find particular use by customers and users in retail and wholesale stores, such as grocery stores, big-box stores (such as Costco), and hardware and home improvement stores (such as Home Depot and Lowe's), hotels, warehouses, airports, among many other potential uses.

BACKGROUND OF THE INVENTIONS

The traditional wheeled grocery store shopping cart has been in use for decades (see, e.g., Cauthon, U.S. Pat. No. 2,890,058, entitled "Rack for Grocery Carts" issued Jun. 9, 1959; Thompson, U.S. Pat. No. 4,046,394 entitled "Shopping Cart" and issued Sep. 6, 1977; Gill, U.S. Pat. No. 4,610,454 entitled "Shopping Cart" and issued Sep. 9, 1986; Rehig, U.S. Pat. No. D294,419 entitled "Shopping Cart" and issued Feb. 23, 1988). For a brief history of the modern shopping cart, see "How a Basket on Wheels Revolutionized Grocery Shopping" at https://priceonomics.com/how-a-basket-on-wheels-revolutionized-grocery/("Priceonomics Article").

The actual birth of the modern day "shopping cart" took place in 1937, in Oklahoma. As has been reported, Mr. Sylvan N. Goldman, owner of a Humpty-Dumpty supermarket chain in Oklahoma, noticed that his customers' per-visit purchases in his stores were limited by how many items they can comfortably carry around in, and then carry out of, the store in their handheld small baskets. In order to improve the shopping experience at his stores for his customers, and equally importantly, to increase their per-visit purchases, he begins work on a solution to the problem. Using a folding chair to which he attached a basket on the seat and wheels on the legs, he designs the very first wheeled shopping cart. After refining his design, he obtains a patent on his invention (U.S. Pat. No. 2,196,914; entitled "Folding Basket Carriage for Self-Service Stores" issue Apr. 9, 1940). Historians have consistently stated that this simple invention revolutionized the in-store shopping experience, and the entire consumer-product store industry as well.

The next significant advance in the art occurred in the mid-to-late 1940's. A freelance inventor, Orla E. Watson, decided to improve on the Goldman design, and devised what is believed to be the first-ever telescoping/nesting shopping cart, for which he was granted a patent in 1949 (U.S. Pat. No. 2,479,530 entitled "Store Basket and Carriage" issued Apr. 16, 1949). That cart had 4 wheels attached to a base, an upright structure attached to the back of the base, with one or two baskets attached to the upright. The base and baskets taper toward the front, and the base was lower in the front than the back, which allowed by the carts to "nest" (or stack) in telescoping fashion.

Efforts to improve of the design and functionality of these shopping carts has been unrelenting. Indeed, a search of the USPTO issued-patents database, using the search terms "shopping" and "cart" in the title of the patent, produced a listing of 864 patents (design and utility). Some of these patented carts are stackable (meaning that they will "nest" together in telescoping) so that when not in use they can be stored in less space, and when collected from the store parking lot for return to the store's cart bay, the worker can push a "wagon train" of many nested carts at one time. Notwithstanding the unrelenting effort to improve on the basic Goldman-type cart design, and there have been an untold number of "improvements," the modern day cart still bears a striking resemblance to the original Goldman design. See, e.g., the carts currently being marketed by such major industry manufacturers and sellers of cart like Wanzl (https://www.wanzl.com/en_DE/products/trolleys/shopping-trolleys~c376); and Unarco (https://www.unarco.com/products.html).

The typical and traditional nesting, stackable cart design (such as that shown in the Wanzl and Unarco product line-ups and in Gill '454) involves an equally traditional construction that includes a bottom frame to which the front and rear wheels are attached, and a rear upright frame element to which the rear of the basket(s) of the cart is attached. In these carts, the bottom frame slants downwardly back to front, is narrower in the front and wider in the back, and the front wheels are positioned such that the distance between the outside rims of the front wheels is less than the distance between the inside rims of the back wheels. All of this is necessary to allow the carts to "nest" in which the front of one cart is pushed into the back of another cart (in which the rear portion of the basket is able to rotate upwardly to allow the front portion of the basket of the "male" cart to be inserted into back portion of basket of the "female" cart); the front wheels of the "male" cart fit within the space between the rear wheels of the "female" cart, and if the cart has a bottom shelf, that front portion of that shelf on the "male" cart slides underneath the rear portion of the bottom shelf on the "female" cart. In other words, the basic "Goldman" design remains the industry standard, notwithstanding the obvious long felt need to improve upon that design, and the efforts of so many others to do so. Indeed, this design cart is now and has been for many years ubiquitous, and is widely used. Some estimates are that twenty-five million of this type cart are in use every day in the United States alone (see Priceonomics Article).

Notwithstanding the indisputable and unbridled "success" of the traditional shopping cart design, it suffers from significant drawbacks. For example, in the traditional design the base portion of the cart is rather small, and is necessarily tapered from back to front to allow nesting. Also, because the basket-supporting portion of the cart frame is located in the rear of the cart, the rearward opening to the under-basket storage space (i.e., the bottom shelf portion of the cart)(the "bottom rack" or "bottom shelf") is thereby limited (and quite small) in width and height, such that the size and shape of packages that can be loaded onto the bottom shelf of the cart from the rear of the cart is similarly limited (and is smaller than what the bottom shelf can actually accommodate). Also, because the bottom rack has to be higher in back and lower in the front, there is usually very little vertical clearance between the bottom rack and the upper basket.

As these carts are designed to be pushed or driven from the rear, if the customer wants to load a large or bulky package onto the bottom shelf, and the rearward-facing access to the bottom shelf is too small to accommodate the package, that will require the customer to go around to the front of the cart in order to load the item, and then again to unload that large package at the checkout aisle and in the parking lot. While that may not seem at first blush like a material inconvenience, as anyone who has tried to do so in a crowded store can attest, in practice it is inconvenient, time consuming and can be an annoyance to other customers. It also requires that anything left in the rear portion of the cart (purse, keys, kids) are left unattended. Thieves have been known to snatch a wallet out of a women's purse that was left unattended in this way.

The bottom shelf on some traditional designs slopes forward, and does not have any side guards, such that some items may slip off the cart while it is being maneuvered. In addition, in the traditional design the width of the bottom shelf tapers to a significant degree toward the front end of the cart, and can become quite narrow (in order to allow for the nesting or stacking of the carts), as the front wheels of the one cart must fit inside the rear wheels of the cart ahead of it in the stacking arrangement. Therefore, the useful cargo space of the bottom shelf in the traditional cart is also restricted by that front-rear wheel arrangement that is required for nesting.

The result is that the bottom shelf of traditional carts is not used to its full potential. Anecdotal observation at any grocery store reveals that the bottom shelf of such carts is often not used at all, and when used, is able to hold less cargo than would be preferred by both the customer and the store owner. Indeed, at the "big box" stores, like Costco, the amount some customers purchase during a given visit is constrained by the size of the cargo space in their single cart. This is due to both the small rear opening, the small relative size of the bottom shelf, and the inconvenience of having to go to the side, or more likely, the front of the cart to load and unload larger items from the bottom shelf that will not fit through the small rear access portal.

The traditional design is thus not only inconvenient in these respects, but by limiting the amount of conveniently accessible cargo space, the store is losing out on revenue, and the customer may have to make more than one visit to the store.

Another ubiquitous cart is the 4-wheeled, flat-platform hotel luggage cart (see, e.g. examples shown at in U.S. Pat. No. D703,905, and at https://www.globalindustrial.com/g/material-handling/trucks-carts/bellman-luggage/bellman-luggage-hotel-carts). This design has similarly stood the test of time (decades). However, these traditional luggage carts are not able to nest in telescoping fashion, and where attempts have been made to do so (see, e.g., U.S. Pat. No. 9,840,265), the result has been less than satisfactory in several respects, including functionality (reduced size platform, inferior nesting) such that the non-nesting hotel luggage cart as shown U.S. Pat. No. D703,905 remains the industry standard.

Therefore, there exists a need in the art for an improved cart that overcomes these drawbacks.

The Figures depict in detail the various preferred embodiments of the several novel and non-obvious aspects of inventive features of the disclosed inventions. The inventive concepts are set forth in the claims, and are not limited to the preferred embodiments shown and depicted, but is of the full scope of the appended claims.

SUMMARY OF THE PREFERRED EMBODIMENTS OF THE DISCLOSED INVENTIONS

The preferred embodiments provide, among other things, carts that have larger and open access to the bottom shelf from the rear of the cart, a bottom shelf that is much larger relative to the size of the cart's basket and overall footprint, a bottom shelf that is not tapered in width toward the front of the cart as in the traditional cart, provides for easier nesting/stacking capability, a sleek, attractive appearance, improved child seat, an improved handle assembly that will accommodate various positions, a cup and accessory holder attached to the rear of the cart on or near the handle that can include strategically placed and easily accessible holders for cup(s), smart phone, and tablet devices), hooks on the outside of the cart basket for purses and reusable grocery bags, and dedicated space for prominently placed and visible on-cart advertising.

Unlike the traditional "Goldman-type" cart in which the carts are able to nest in telescoping fashion because the front wheels of the "male" cart slide in between the rear wheels of the "female" cart when nested, and the lower shelf of the "male" cart slides under the lower shelf of the "female" cart, the carts in the preferred embodiments herein have the opposite arrangement. In the embodiments herein disclosed, the front wheels of the cart are situated laterally wider than the rear wheels, and the bottom shelf portion or base frame structure of the cart is wider and higher toward the front of the cart than in the rear portion of the cart.

In another aspect shown in some of the preferred embodiments that have an upper basket-type structure above and attached to the base frame structure, the means for attaching the basket-type structure to the base frame structure can extend from the front portion of the base frame structure to the rear portion of the basket-like structure, thereby avoiding any obstacles that would preclude the front portion of the basket-like structure on the "male" cart from being able to slide into the rear portion of the basket-like structure on the "female" cart in the nested arrangement.

This allows for a wider front portion of the cart, and a larger front portion of the bottom shelf. The rear wheels in one preferred embodiment are located underneath the bottom shelf. The bottom shelf is larger, and thus capable of carrying more cargo. This is a benefit for the customer, and is also a benefit for the store owner who prefers the greater revenue-per-customer as that a larger, more fully filled cart will produce.

There are no "legs" or frame elements on the rear of the cart basket extending vertically or near-vertically downward to restrict the opening from the rear of the cart to the bottom shelf. This has the beneficial effect of providing unimpeded rear access to the bottom shelf, without any frame elements in the way to restrict access. This allows for more convenient access, and allows for larger, bulkier items to be loaded from the rear of the cart, without the customer having to move to the front of the cart, leaving kids, keys and purse unattended in the rear of the cart, and bothering other customers.

As shown and described herein, there are any number of ways to attach the basket-like structure to the base frame structure without departing from the inventive concepts claimed. In the ubiquitous "Goldman-type" cart, the basket-type structure is attached to the lower frame at the rear of both structures. While this arrangement allows for nesting of the carts, the attachment means in this arrangement create obstacles to full access to the bottom shelf from the rear of the cart.

Also disclosed and claimed is a hotel-type luggage cart that has a large, solid-piece floor board, large and unobstructed storage capability, and is capable of easy and compressed nesting, whereas the ubiquitous hotel luggage cart that is currently in use in hotels throughout the world are not capable of nesting, and therefore take up considerable floor space when not in use.

For the avoidance of doubt, the several inventions herein depicted and described are not limited to a cart having all or even a majority of these features, as any one or more of these features is believed to be entitled to patent protection standing alone. Nothing stated in this Summary section is intended to or should be interpreted to limit the full breadth and scope of the appended Claims.

DETAILED DESCRIPTION OF THE PREFERRED EMBODIMENTS

Figure 1:
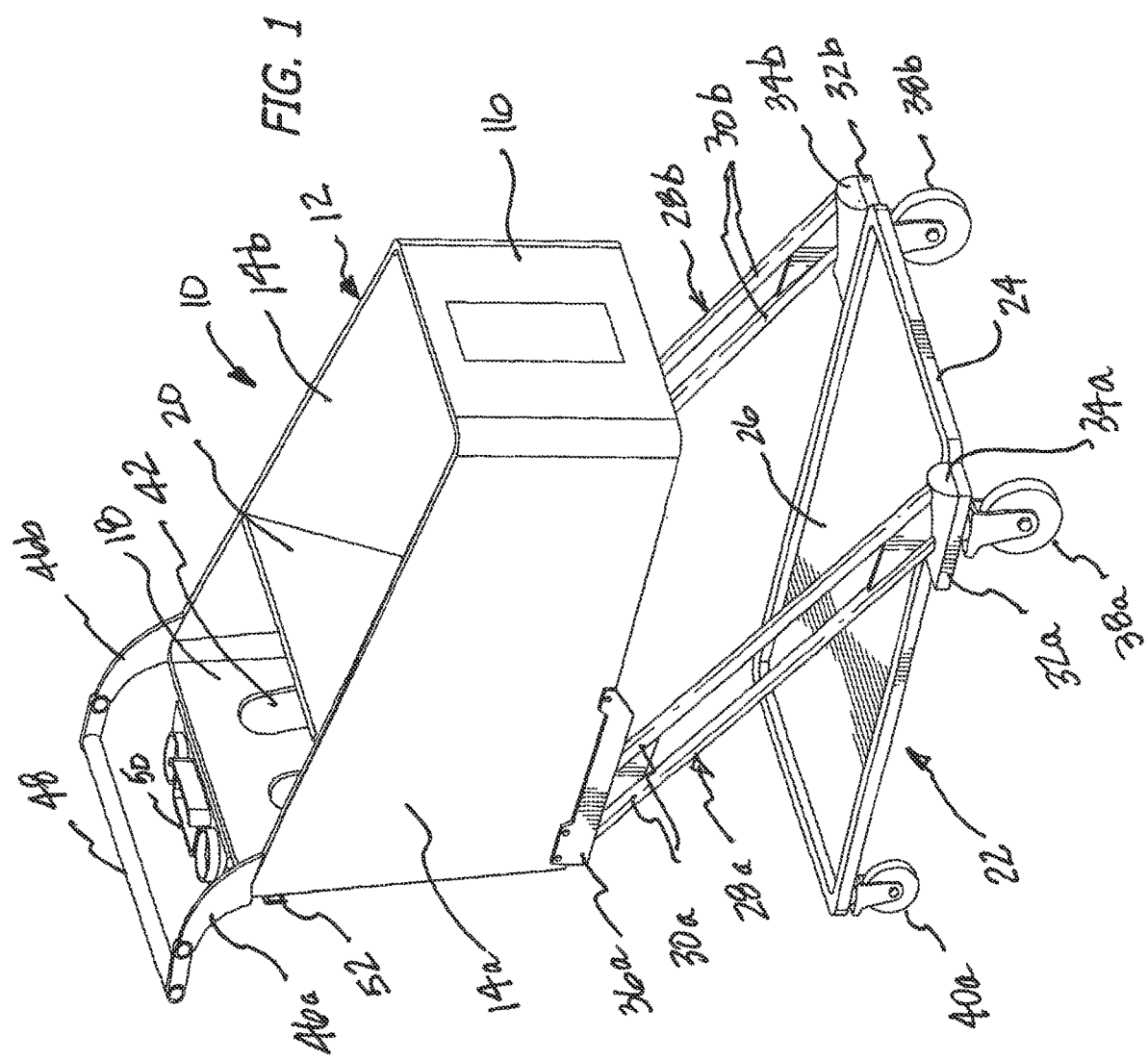
FIG. 1 is an isometric view of a stackable cart in one preferred embodiment.

It should be noted that although actual and relative size(s) of the carts and their various components are either shown or discernable from the attached photographs and drawings, the inventive concepts disclosed may include, but are not limited to, any particular size or relative size(s) and types of carts and their components. Also, the word "cart" is used generically to refer to any wheeled vehicle used to transport cargo of any nature. Other terms, such as dolly, trolley, carriage, pushcart, shopping cart, etc., are also sometimes used by those skilled in the art. The consistent use of the word "cart" herein is not limiting in any fashion, and includes all other such and similar terms and terminology. The word "cargo" is also used herein in its generic and broadest connotation. The carts herein described and claimed can be used with any type of cargo, from groceries to hardware, and anything else under the sun that can be transported in or on a cart. Similarly, the phrase "in a/the cart" also means "on a/the cart" and includes every manner in which cargo can be loaded onto, into or attached to a cart for transportation. The word "ground" is also sometimes used herein to refer to the surface on which the cart is intended to move in order to transport cargo. The word "ground" is used in its generic sense and refers to any surface upon which a cart can be moved. As used herein, "front" in relationship to a cart or component generally refers to the portion of the cart that is furthermost forward in the typical forward direction of travel of the cart, and is furthest away from the handle portion of the cart where the person using (or pushing the cart) is located when pushing the cart.

The embodiment shown in FIGS. 1 to 8 depicts a grocery-store type cart 10 that has an upper basket 12. The upper basket 12 is an open-top box-type structure having lateral side 14a and 14b, a front wall 16, a rear-wall 18, a mid-wall portion 20 and a bottom portion 21. As in traditional carts, the mid-wall 20 is stationary, and the rear wall 18 is rotatably attached at its upper edge so that it can rotate up and out of the way to allow for nesting with other carts in which the front portion of the basket on one cart will slide into the rear portion of another cart and thus "nest" in telescoping fashion. Also, the overall shape of the basket 12 is tapered on all sides from rear to front to facilitate nesting in telescoping fashion in which the front portion of the basked of one cart can be freely and sufficiently deeply inserted in another cart's basket that is ahead of it in the nesting arrangement.

The cart 10 has a lower section or base section 22 that is comprised of the base frame 24 and a platform piece 26 that is attached to the base frame 24 in such a way as to provide a lower shelf onto which cargo can be loaded.

In this embodiment, the upper basket 12 is attached to the base frame 24 by a pair of side support struts 28a and 28b. Here, each strut 28 comprises a pair of elongate legs 30a and 30b. Including two separate legs 30 in each strut 28 increase stability, and makes for a more stable and secure attachment to the base frame 24 and the basket 12. In this embodiment, the base frame 24 includes flanges 32a and 32b securely attached on either side of the frame, which provide the attachment platform for the struts 28. The flanges 32 can also include a decorative and protective cover pieces 34a and 34b over the top of the flanges 32 to hide and protect the attachment point.

Figure 2:
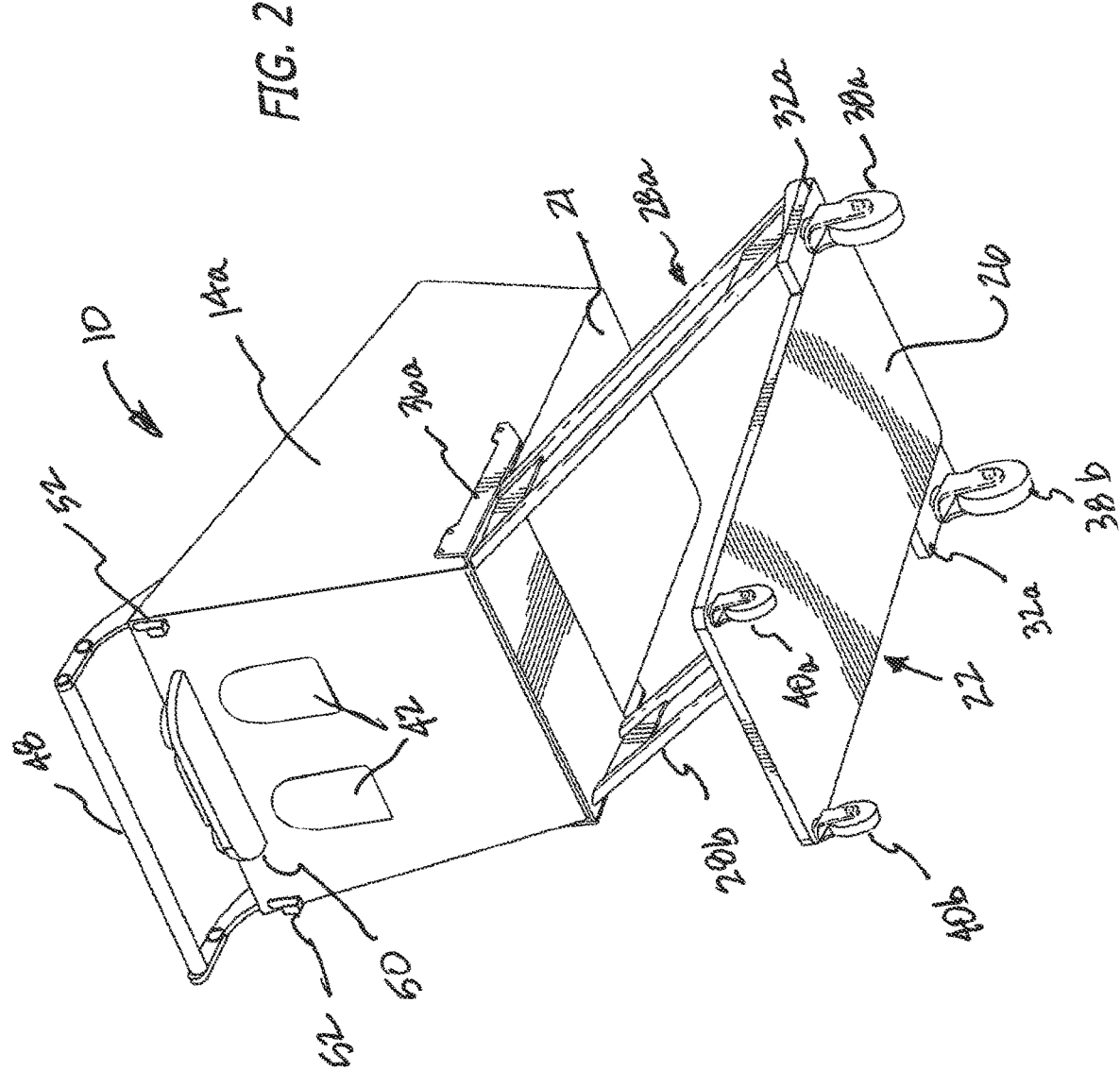
FIG. 2 is an isometric view of a stackable cart showing the bottom shelf.
Figure 5:
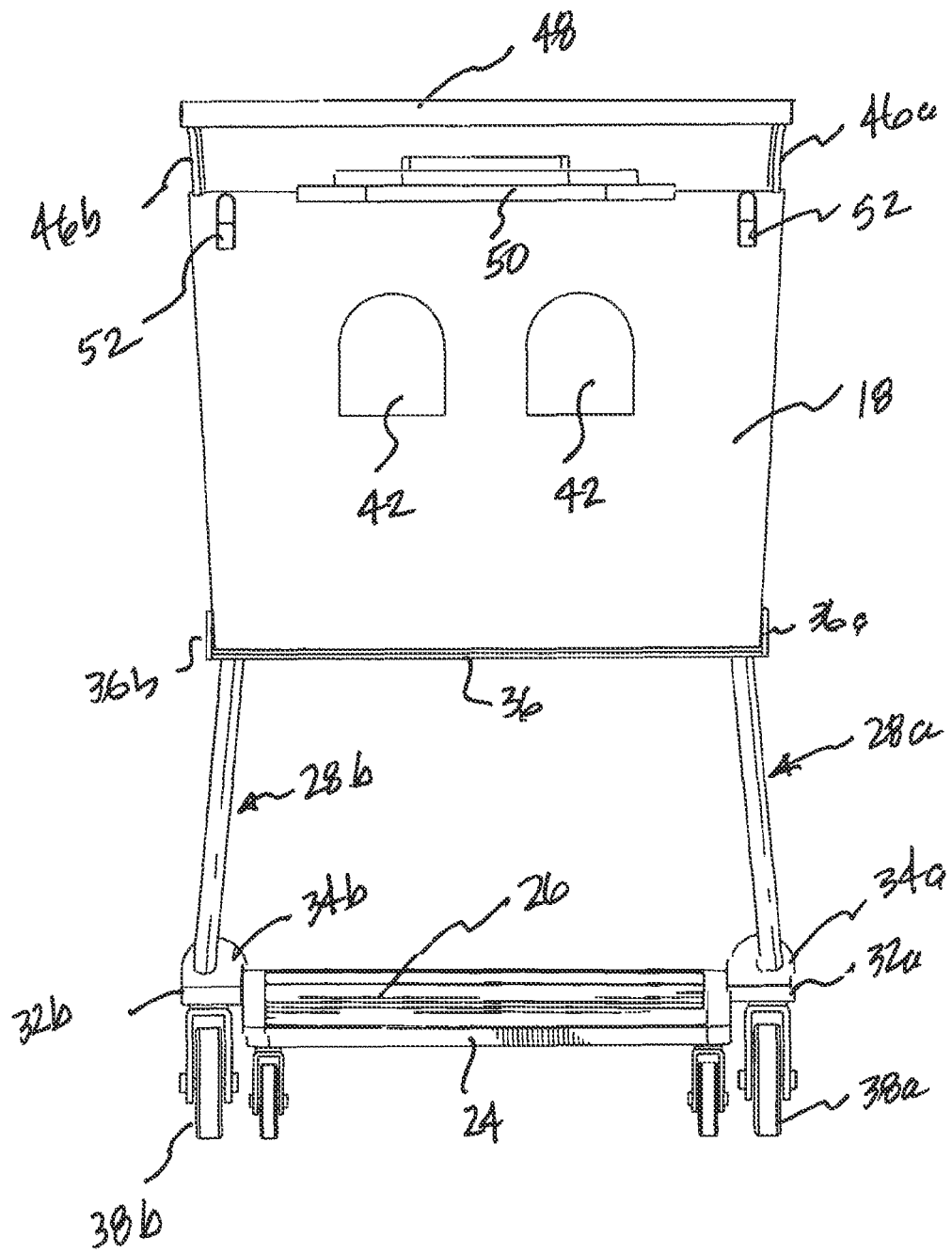
FIG. 5 is a rear view of a stackable cart in one preferred embodiment.
Figure 6:
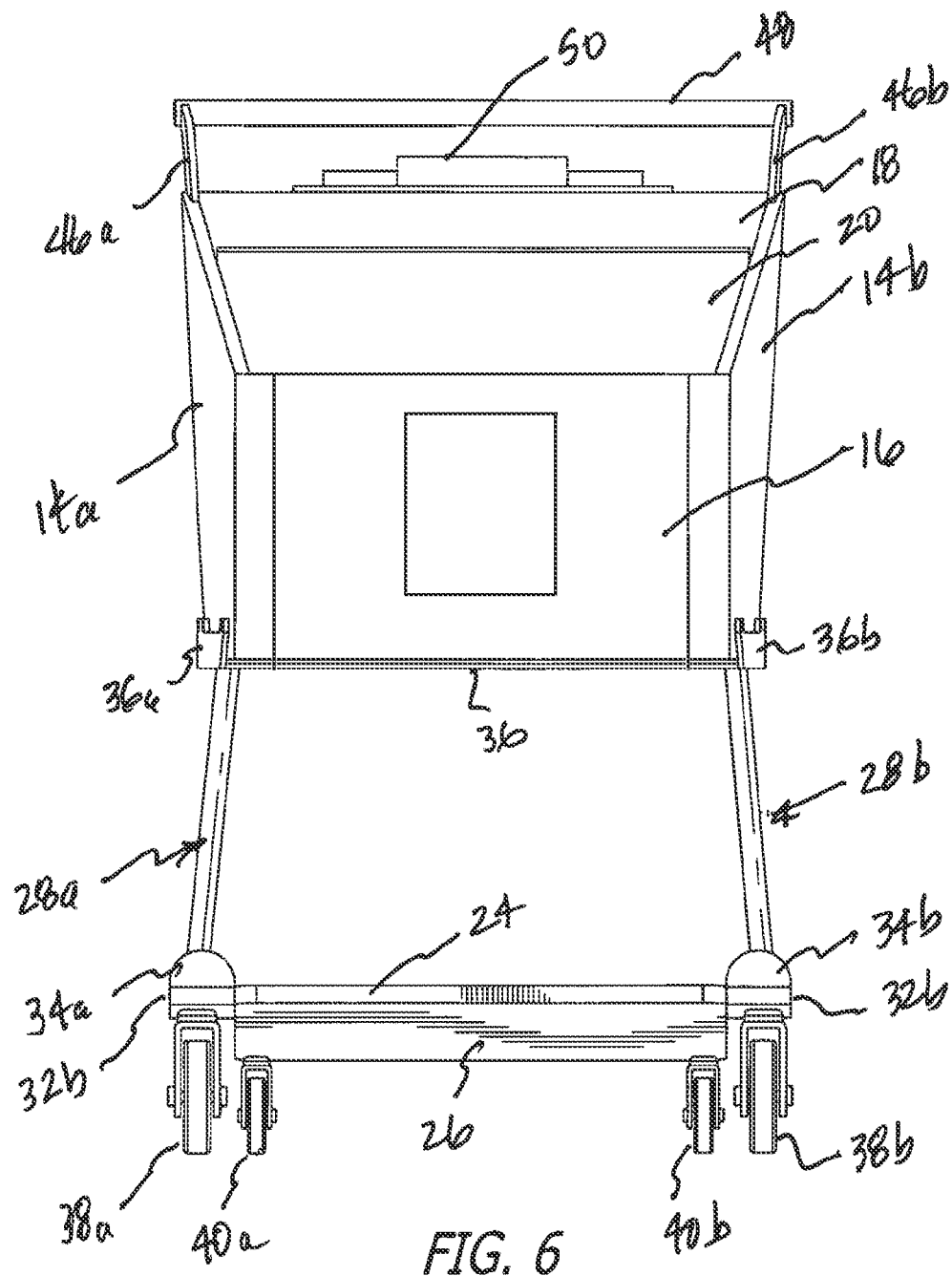
FIG. 6 is a front view of a stackable cart in one preferred embodiment.
Figure 7:
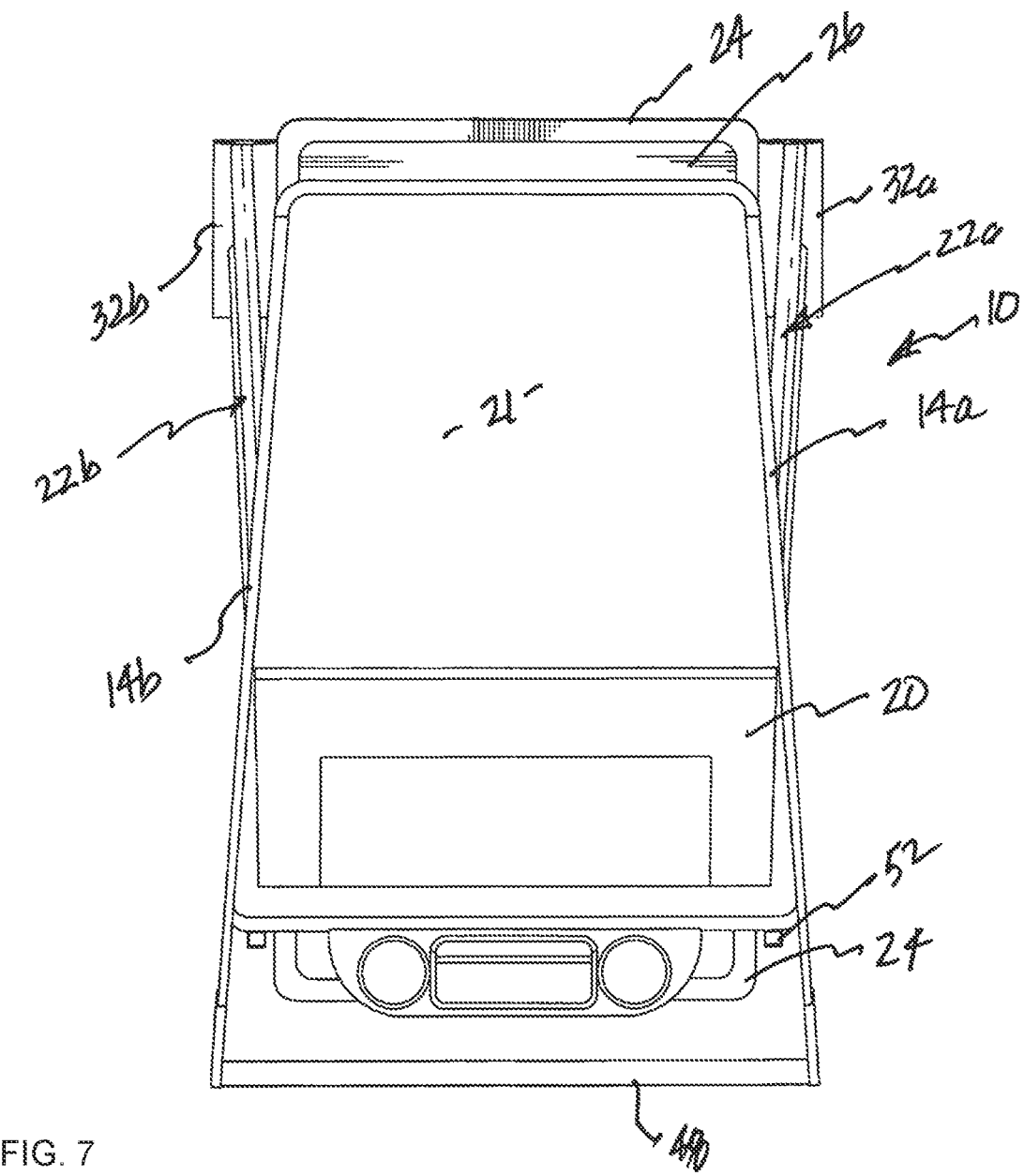
FIG. 7 is a top view of a stackable cart in one preferred embodiment.

The other end of the struts 28 are attached in this embodiment to the underside of the rear portion of the basket 12, and to side support flanges 36a and 36b as best seen in FIG. 2. The support flanges 36 can be separate pieces or a single piece component (as shown in FIG. 5) that also extends across the entire width of the basket 12. It will be noted that the struts 28 are attached to the base 22 near the front of the base 22 of cart 10, and then the struts 28 extend diagonally rearwardly toward the rear of the cart 10. It will be noted that this arrangement leaves the front area of the basket 12 fully exposed and unencumbered with any nearby or protruding structures that would prevent the front portion of the cart 10 from freely nesting into the basket of the cart ahead of it in the nesting position of multiple carts. It will also be noted that this arrangement of the struts 28 also leave the area between the real portion of the basket 12 and the rear portion of the base 22 also unencumbered, such that the access to the base platform (or shelf) 26 is completely open, and not constricted by any attachment structure, whereas in the still-ubiquitous Goldman-type design, the rear access to the bottom shelf is constricted by surrounding attachment and support structure(s).

In this embodiment, the cart 10 has four wheels, front wheels 38a and 38b, and rear wheels 40a and 40b, which are attached to the base structure 22 near the four respective corners of the base frame 24. In order to allow the cart 10 to be turned easily to navigate through stores, up and down aisles, and avoid other carts, either or both of the sets of wheels should be able to spin about their around their vertical axis.

As best seen in FIGS. 2, 5, 6 and 8, the front wheels 38a and 38b are attached to the underside of the side flanges 32a and 32b, respectively. As the side flanges 32 extend out laterally from the base frame 24, the front wheels 38a and 38b. As also best seen in those Figures, the rear wheels 40a and 40b, however, are attached to the sides of the base frame 24. Because in this embodiment, the base frame 24 is substantially rectangular in shape with substantially parallel side portions, this results in the desired place of the front wheels 38a and 38b in terms of lateral distance between them relative to the lateral distance between the rear wheels 40a and 40b, as can best be seen in FIG. 5.

As shown in FIG. 5, the lateral distance between the rear wheels 40a and 40b relative to the lateral distance between the front wheels 38a and 38b is such that the front wheels 38a and 38b and easily slide past the rear wheels 40a and 40b in order to allow adjacent carts 10 to nest in a telescoping fashion. As will be apparent to a person of skill in the art (and to anyone who goes grocery shopping), this is completely different that the usual and ubiquitous shopping cart in which the front wheels are laterally narrower than the rear wheels.

Figure 3:
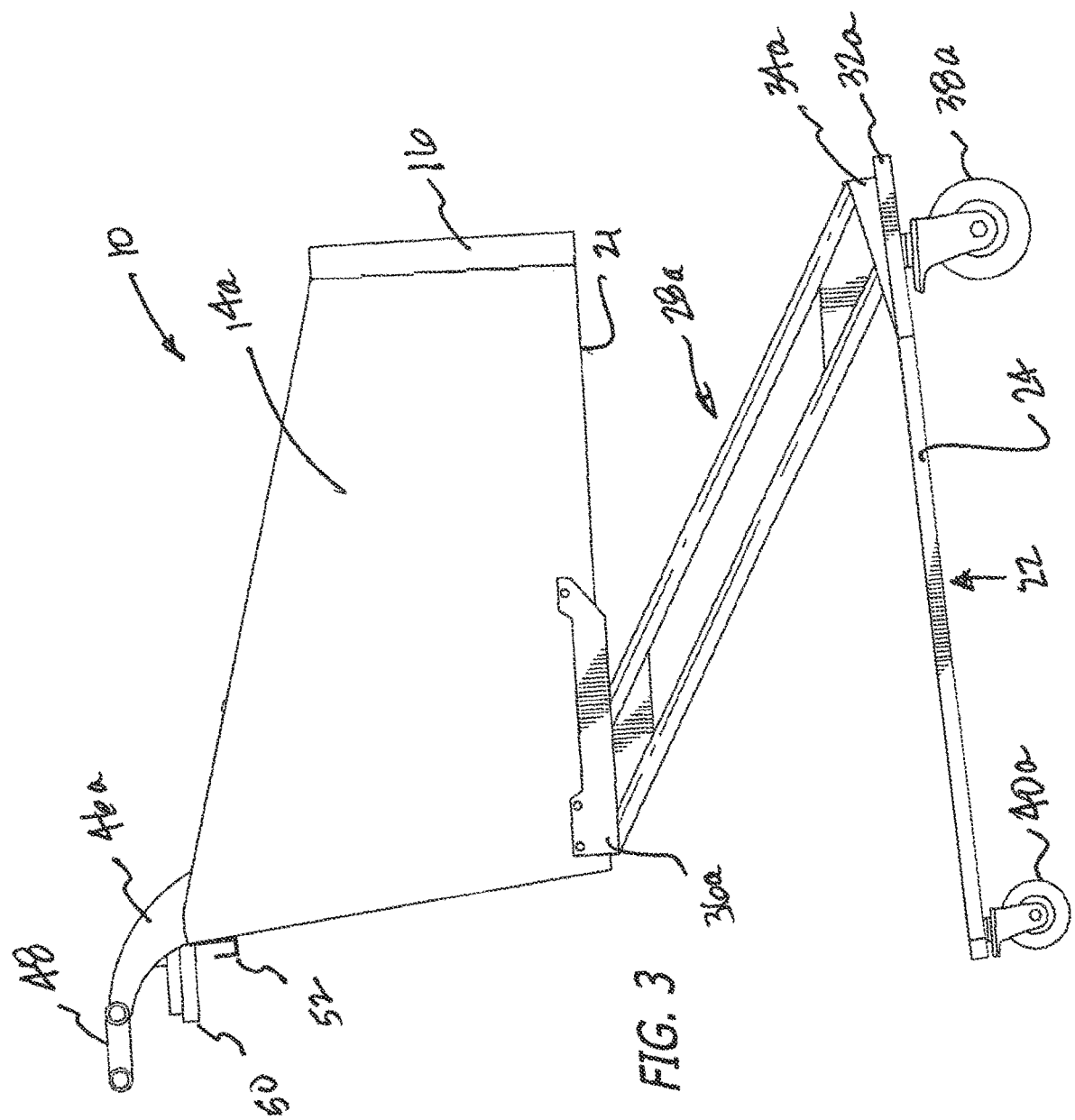
FIG. 3 is right side view of a stackable cart in one preferred embodiment.
Figure 4:
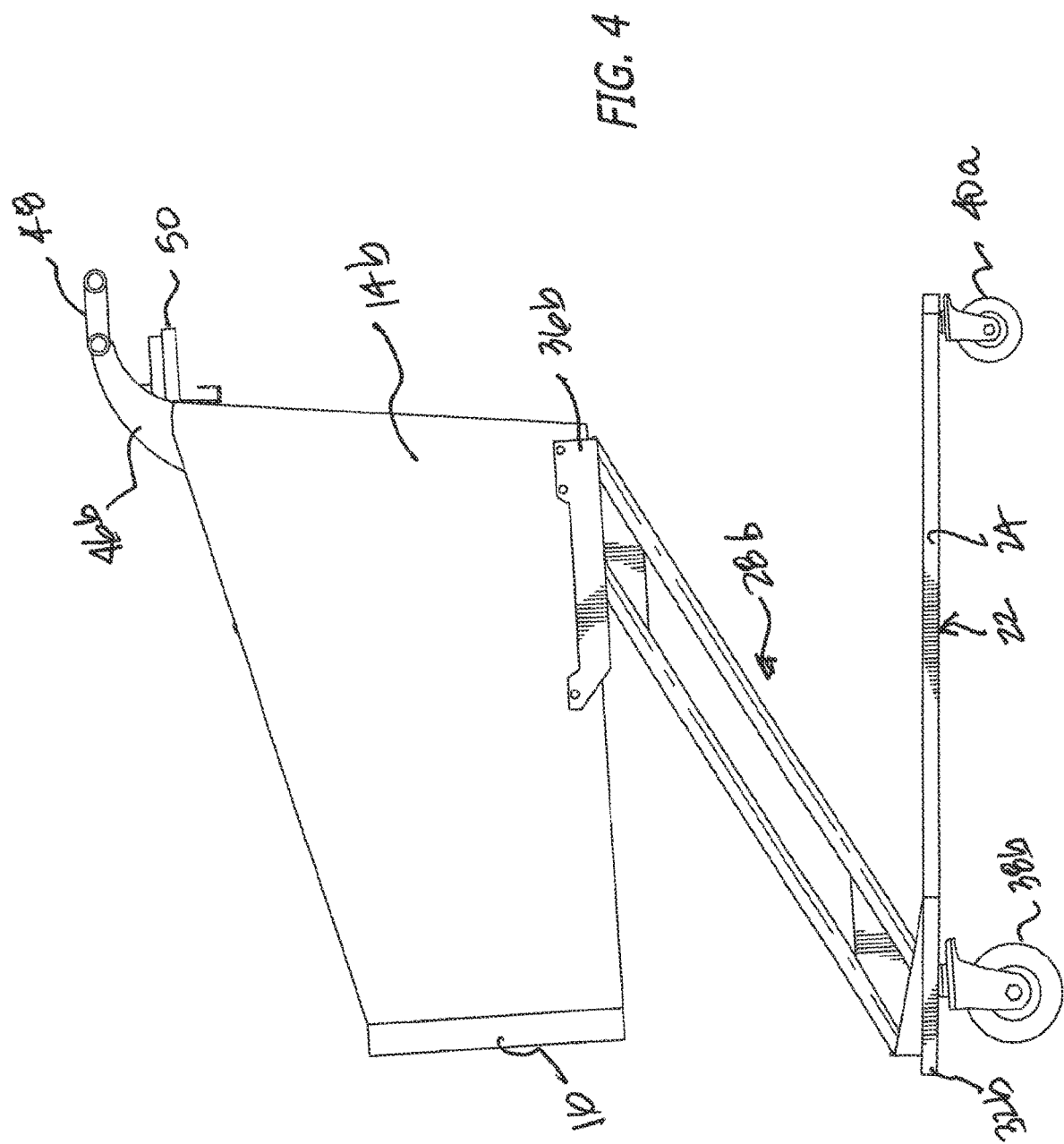
FIG. 4 is a left side view of a stackable cart in one preferred embodiment.
Figure 8:
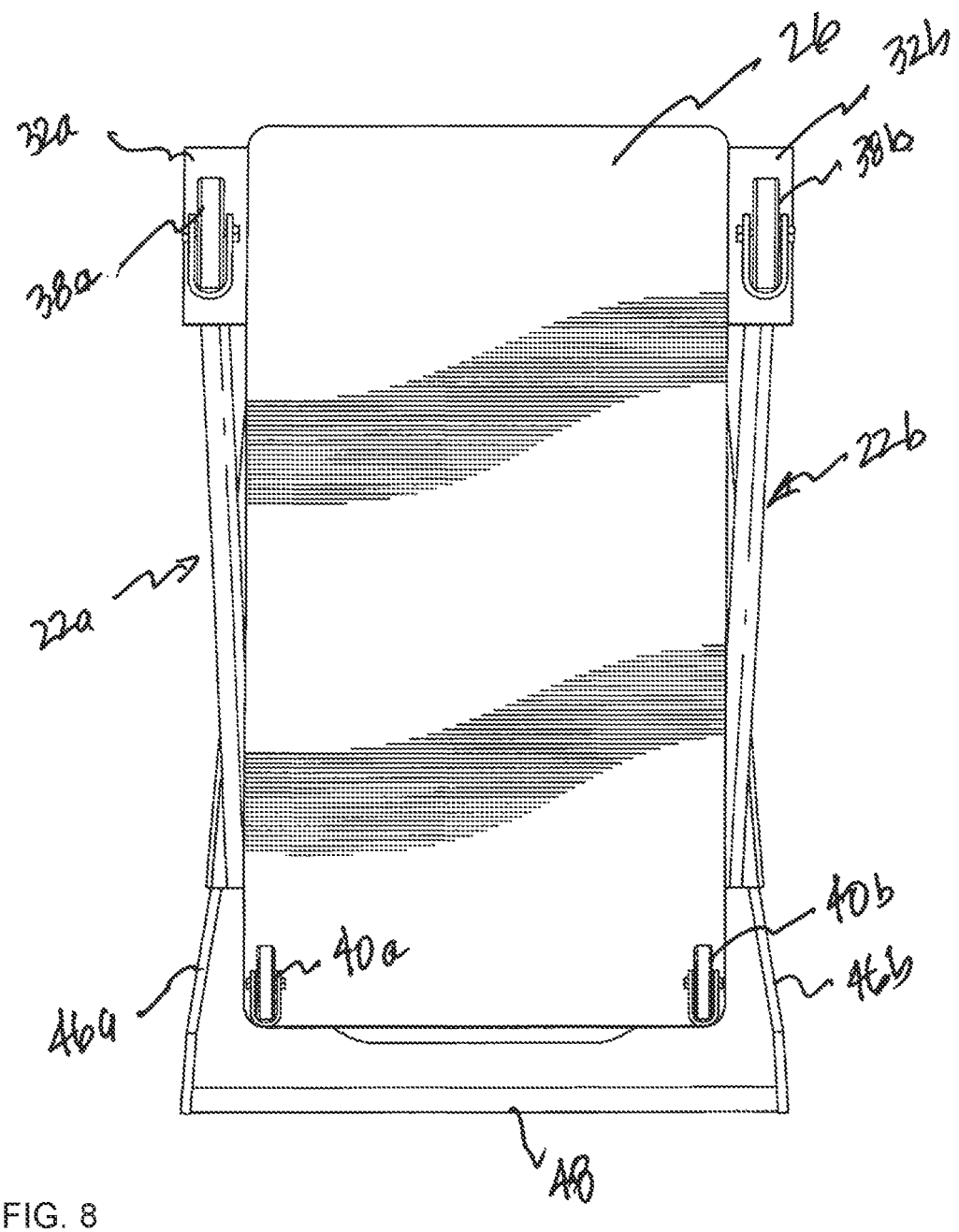
FIG. 8 is a bottom view of a stackable cart in one preferred embodiment.
Figure 9:
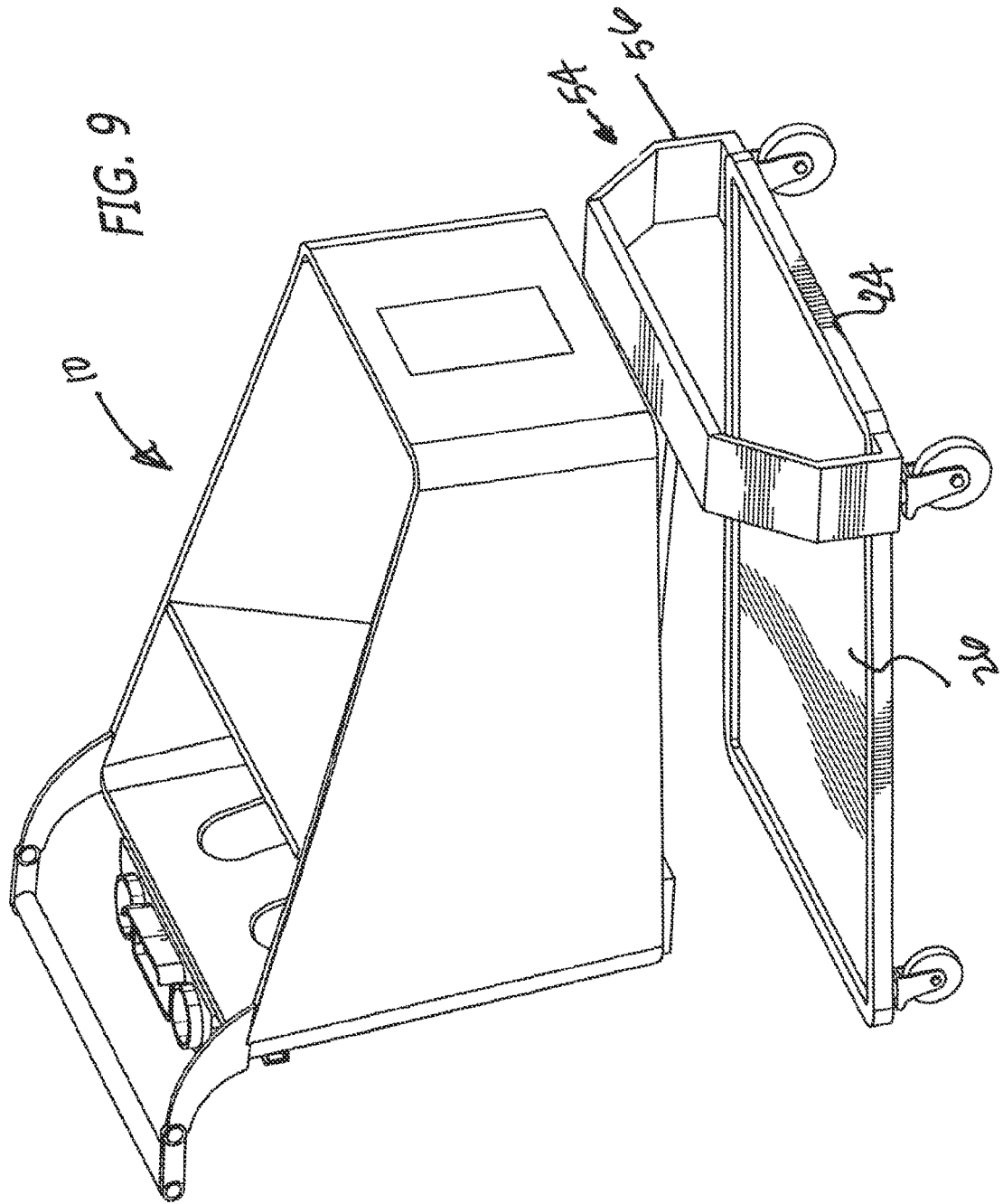
FIG. 9 is an isometric view of a stackable cart in one preferred embodiment.
Figure 10:
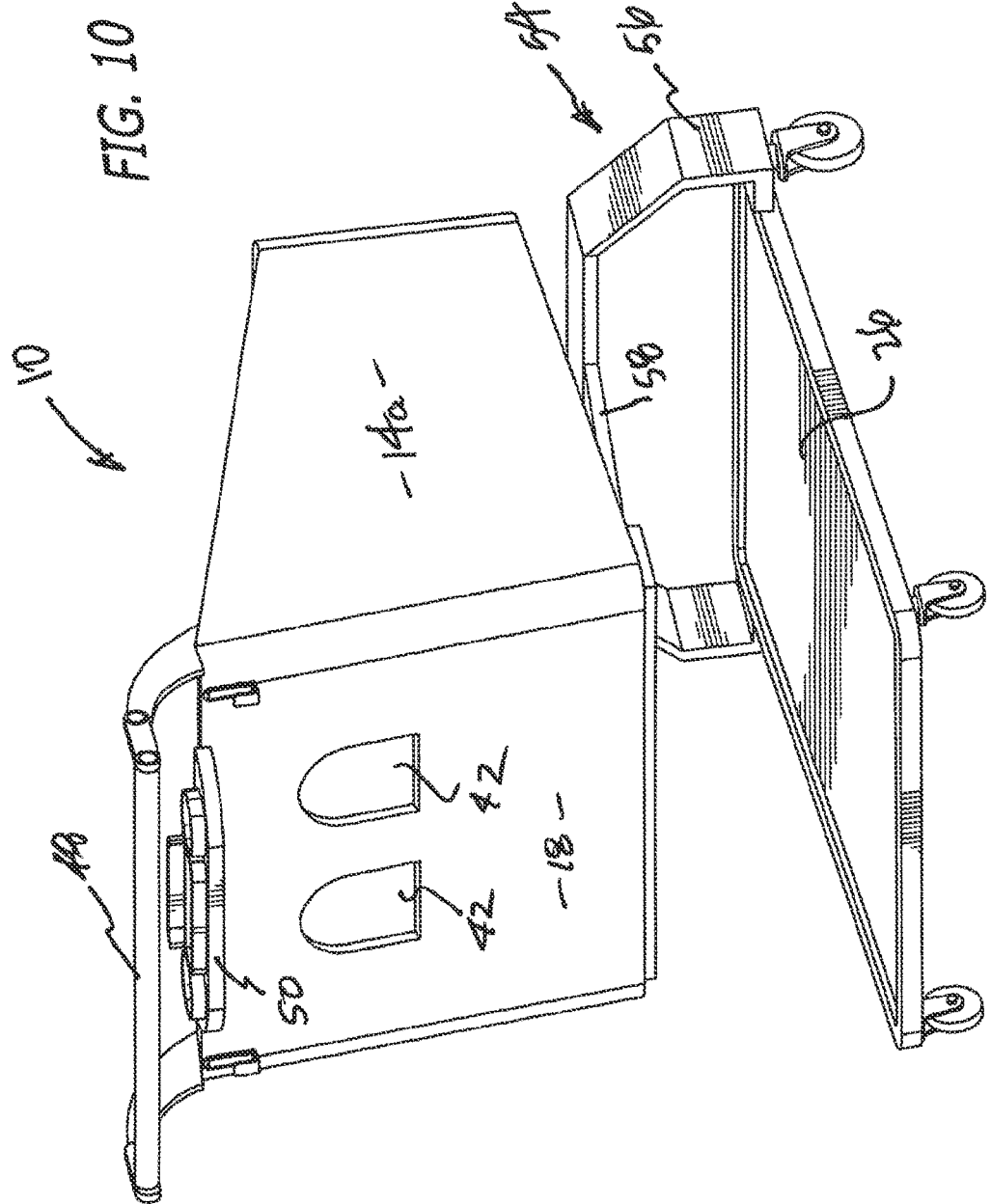
FIG. 10 is an isometric view of a stackable cart in a second preferred embodiment.
Figure 11:
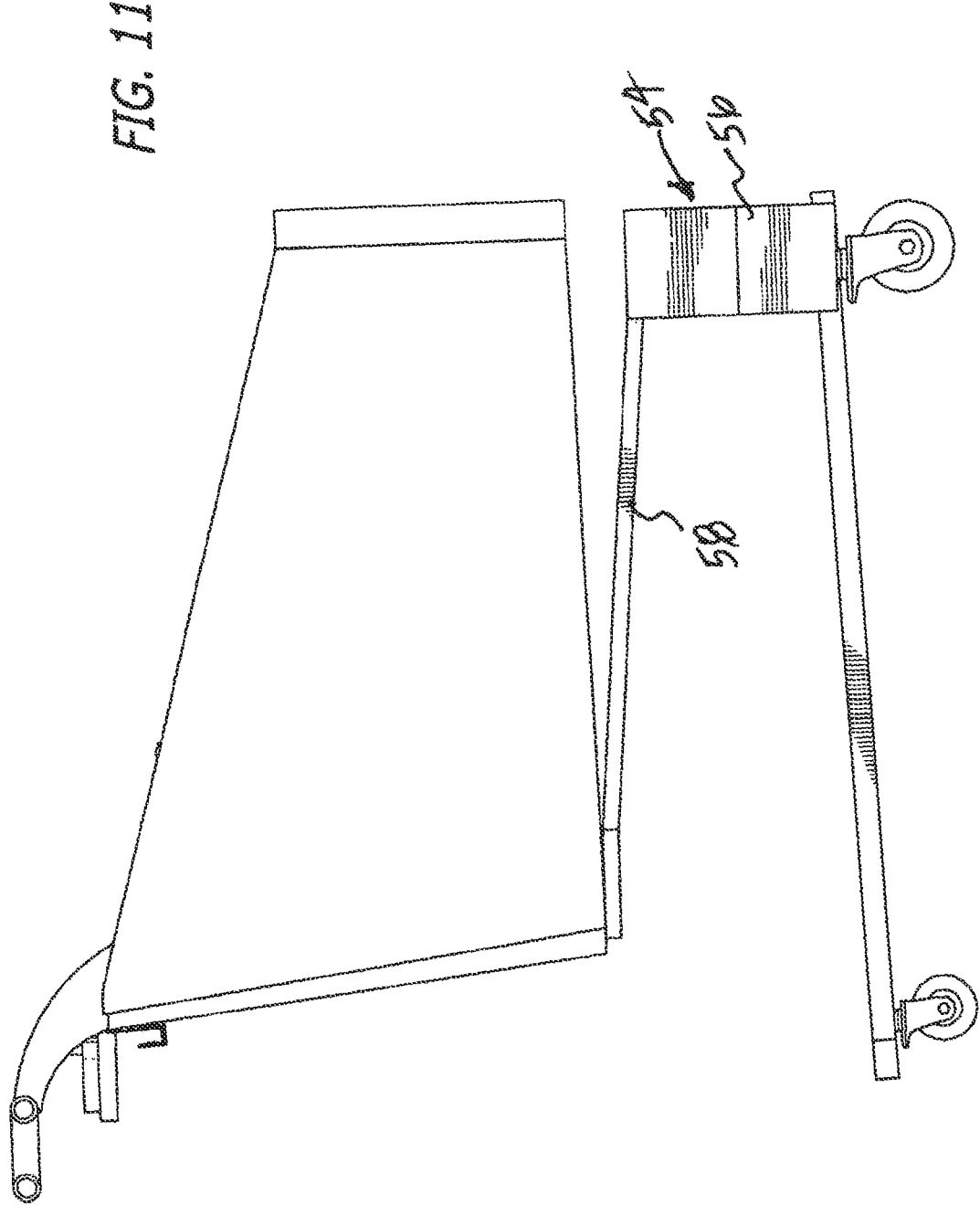
FIG. 11 is a right side view of a stackable cart in a second preferred embodiment.
Figure 12:
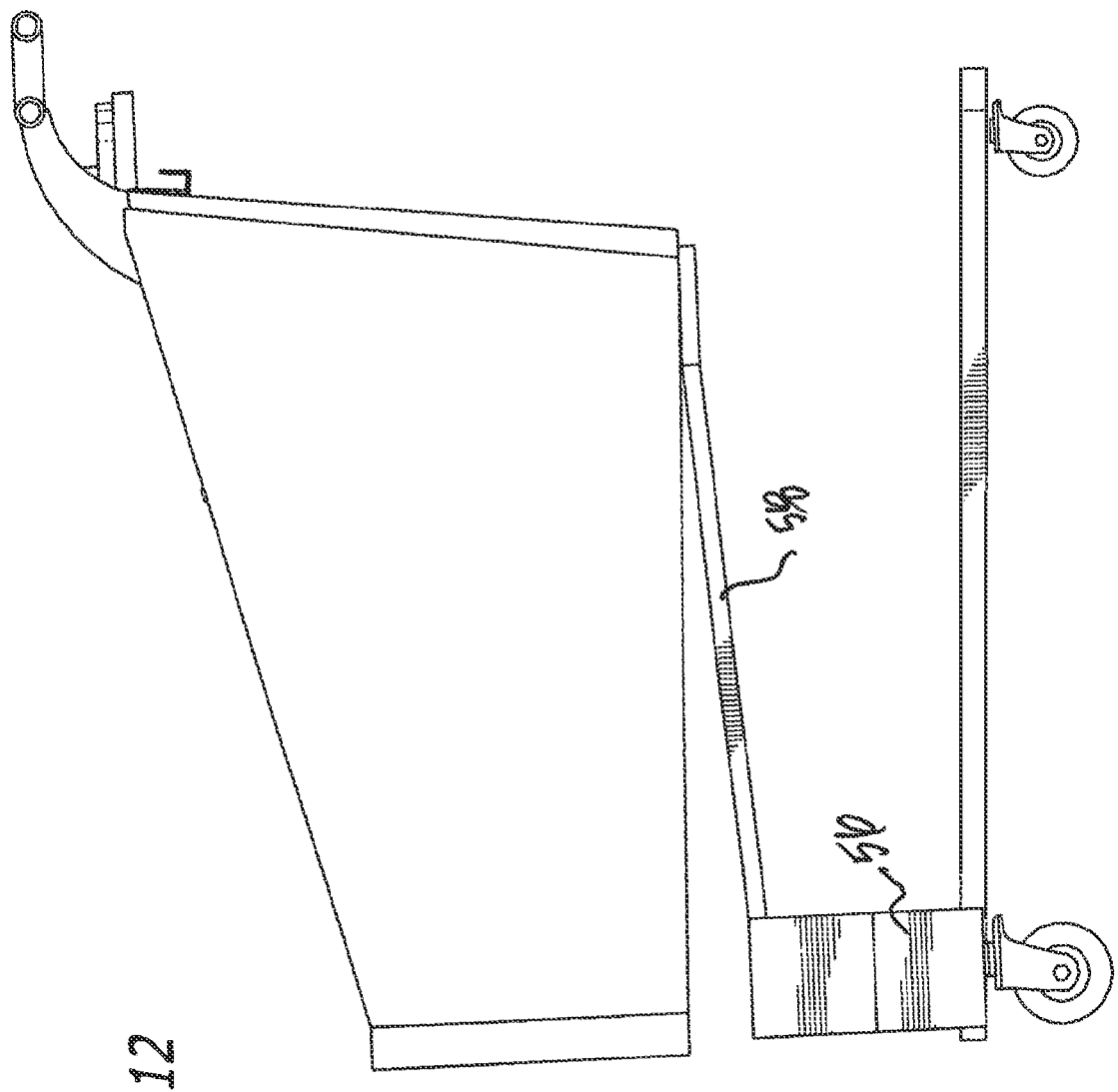
FIG. 12 is a left side view of a stackable cart in a second preferred embodiment.
Figure 13:
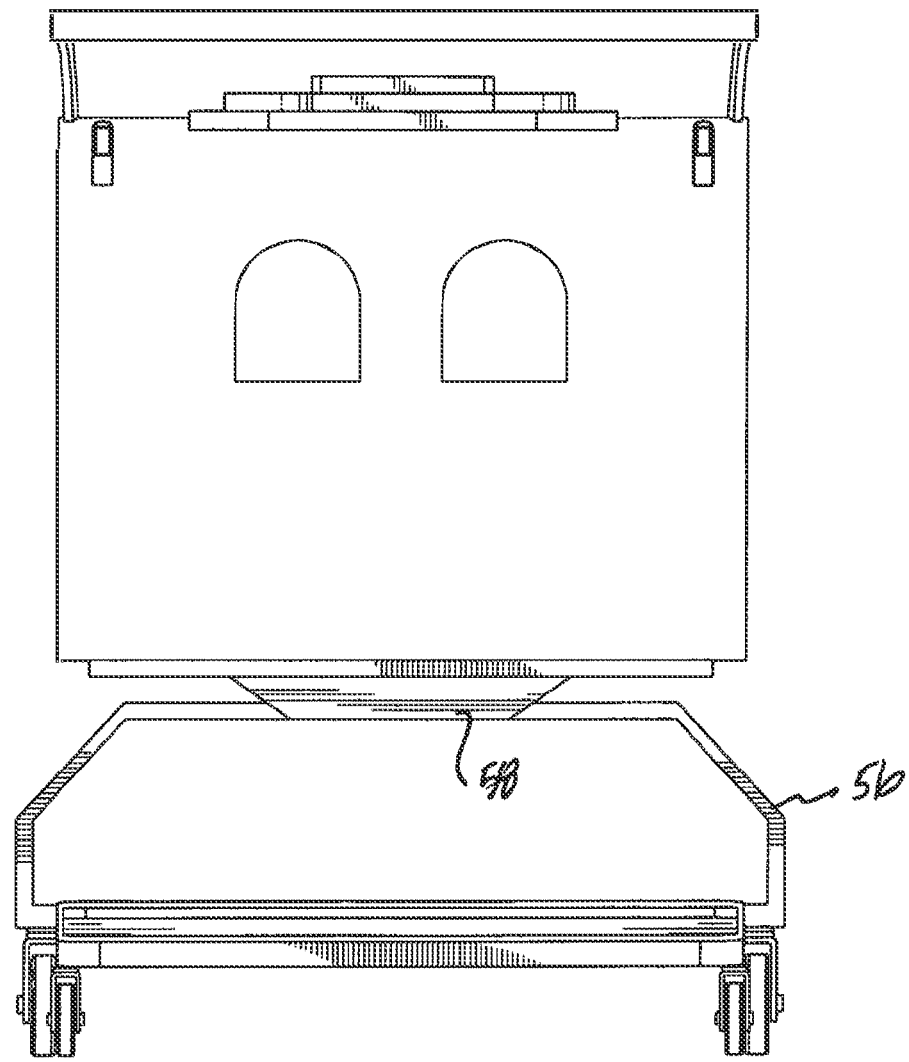
FIG. 13 is a rear view of a stackable cart in a second preferred embodiment.
Figure 14:
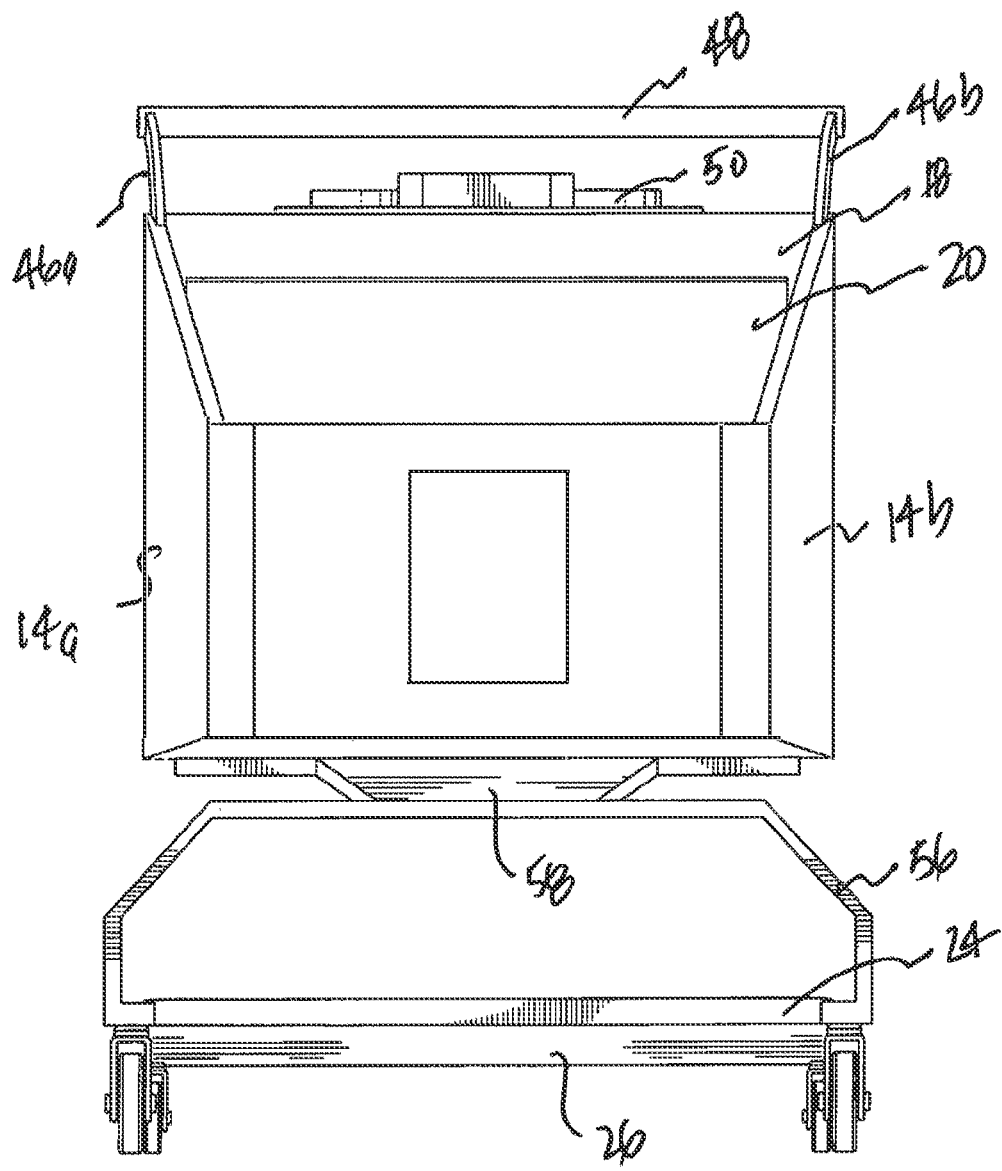
FIG. 14 is a front view of a stackable cart in a second preferred embodiment.
Figure 15:
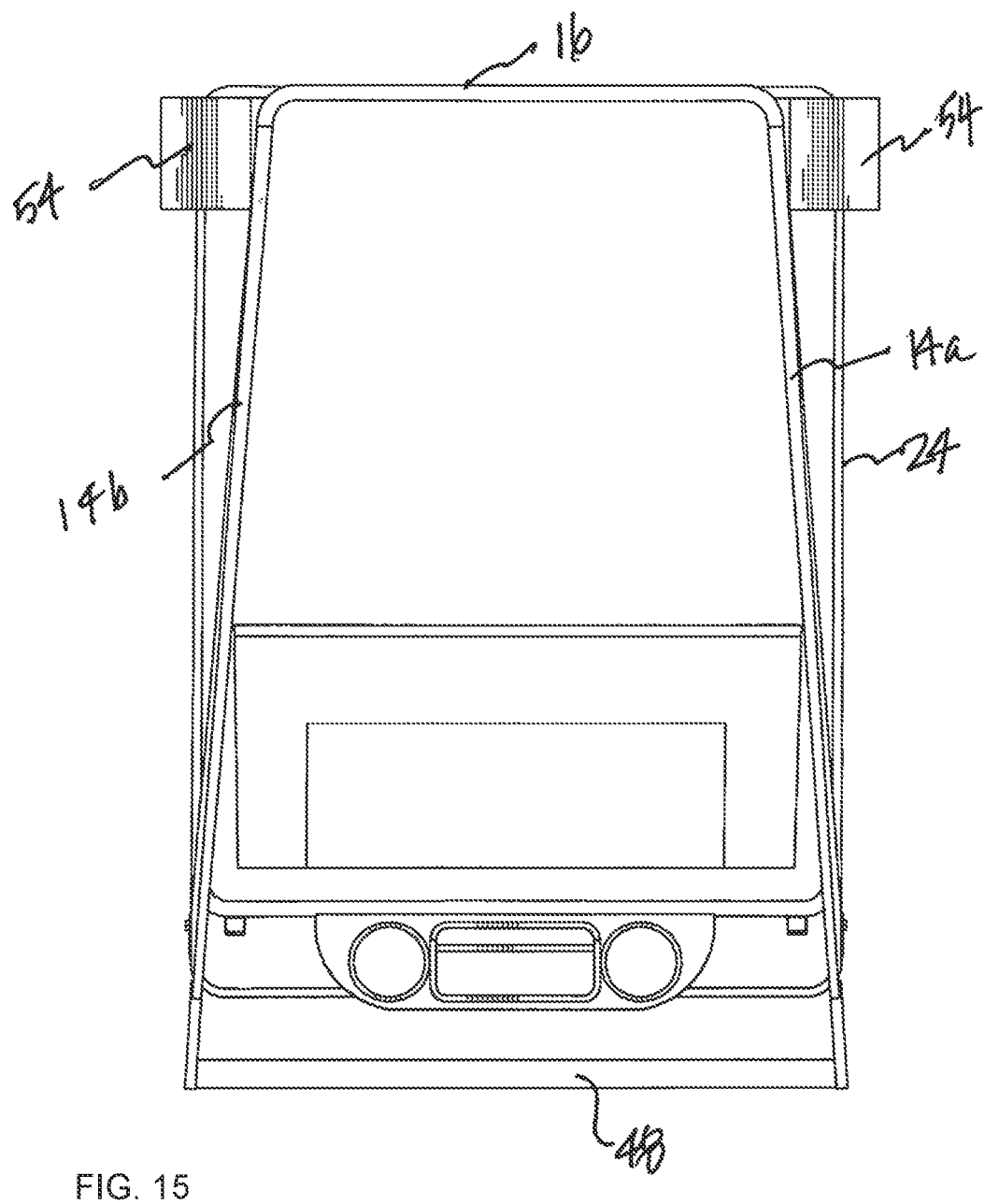
FIG. 15 is a top view of a stackable cart in a second preferred embodiment.
Figure 16:
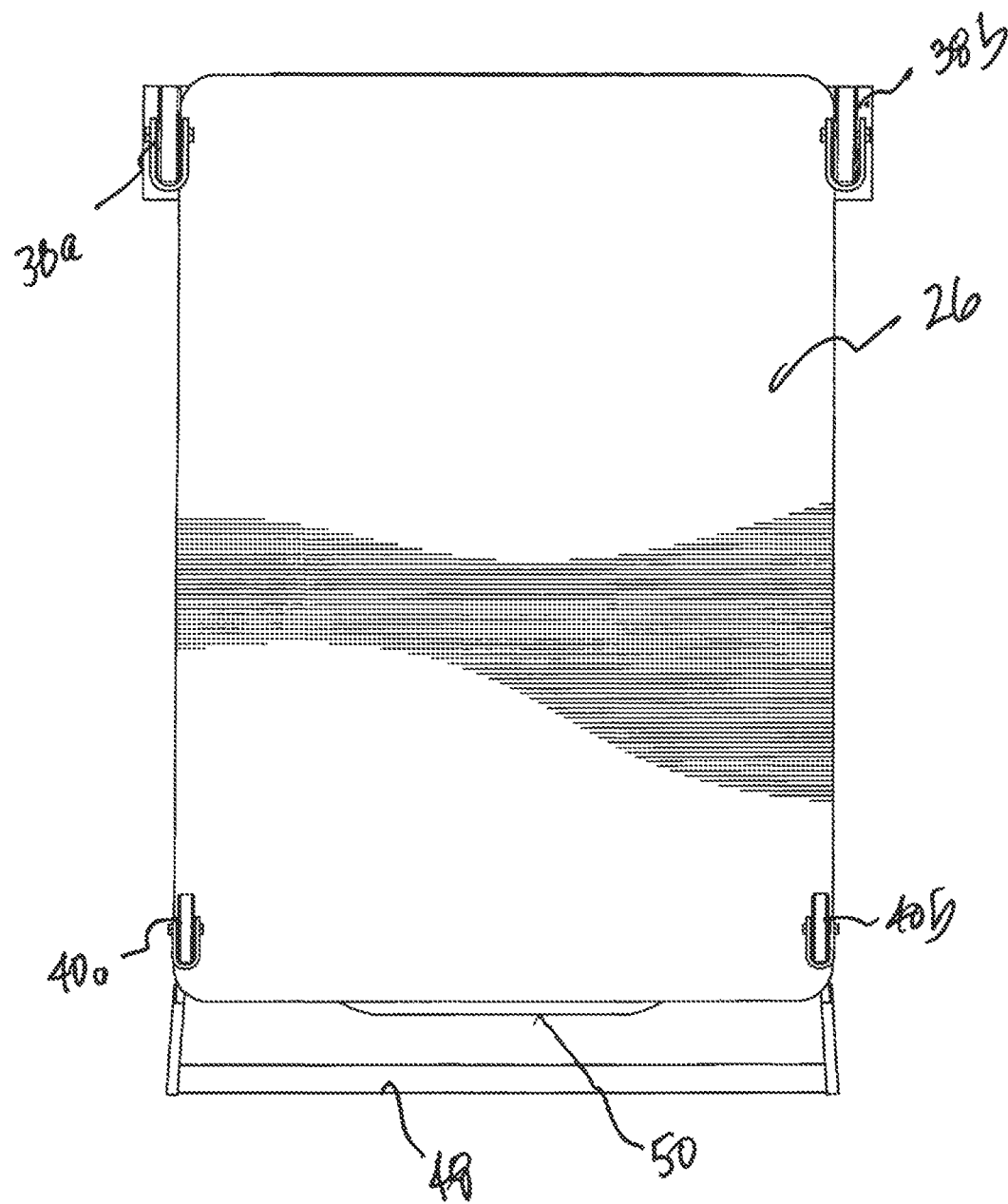
FIG. 16 is a bottom view of a stackable cart in a second preferred embodiment.

As best seen in FIGS. 3 and 4, the base 22, base frame 24 and the base platform 26 slant toward the back of the cart 10, unlike the typical shopping and other similar carts in which the bottom shelf slants downwardly and becomes narrower toward the front of the cart. And, as best seen in FIG. 8, the base 22 of the cart 10 does the opposite. It slants downward toward the rear of the cart 10, and it becomes wider toward the front of the cart 10. The advantages of this this unique and against-conventional-wisdom arrangement contribute to the benefits of the inventive concepts herein disclosed as described above.

Figure 32:
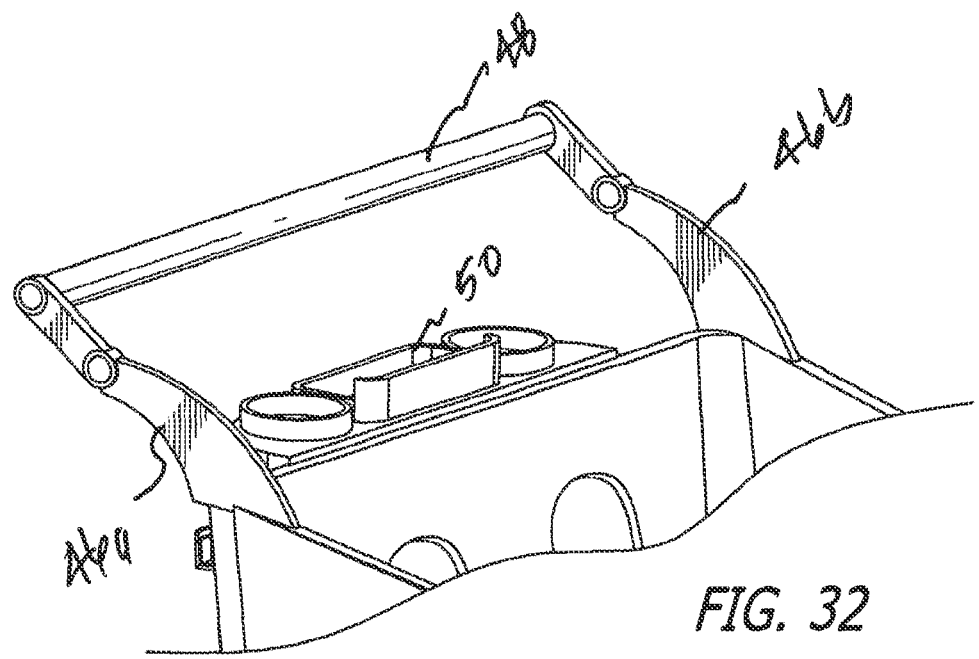
FIG. 32 is an isometric view is a side view showing the holder unit in position near the handle of a shopping cart, and the pivoting handle unit in a partially elevated position.
Figure 33:
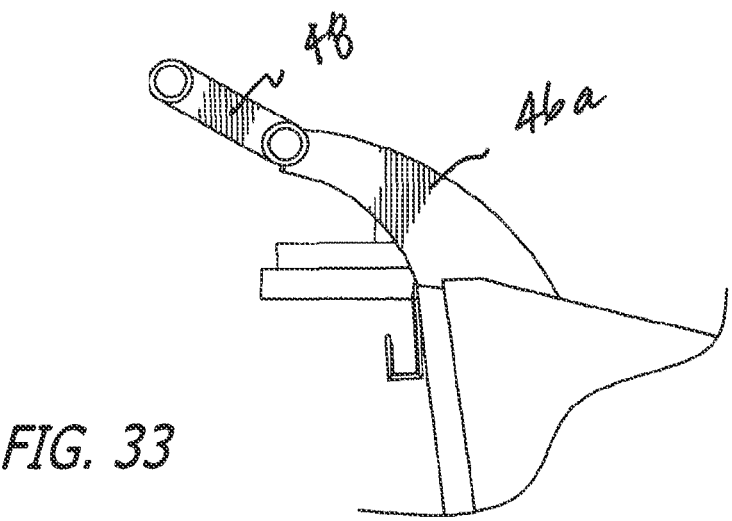
FIG. 33 is a side showing the holder unit in position near the handle of a shopping cart, and the pivoting handle unit in a partially elevated position.
Figure 34:
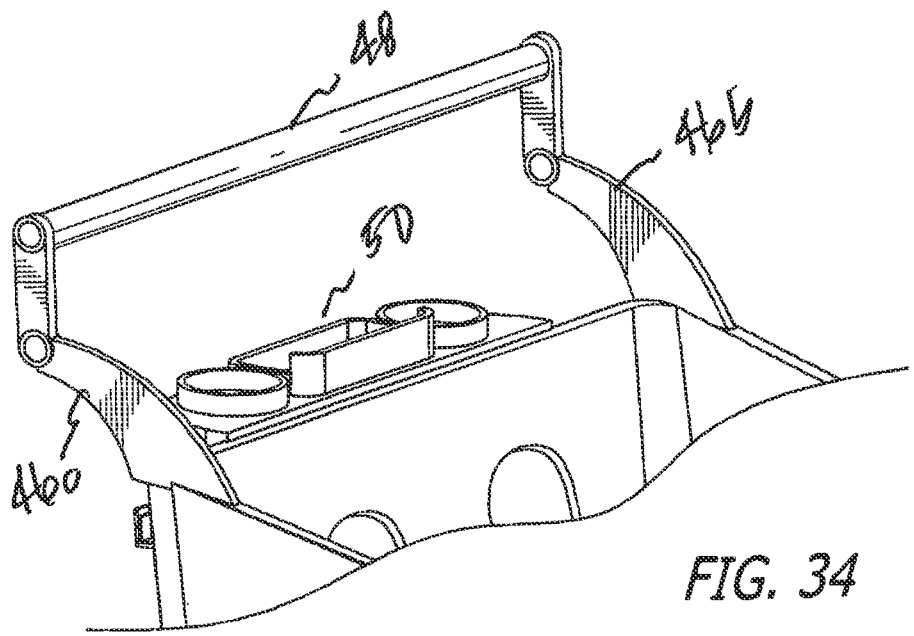
FIG. 34 is an isometric view of a similar to that in FIG. 32, but showing the adjustable handle rotated to a vertical position.
Figure 35:
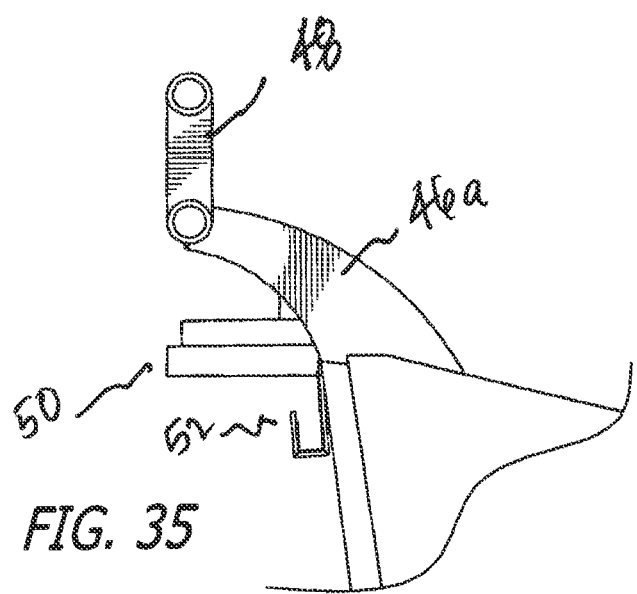
FIG. 35 is a side view of the component shown in FIG. 34.
Figure 36:
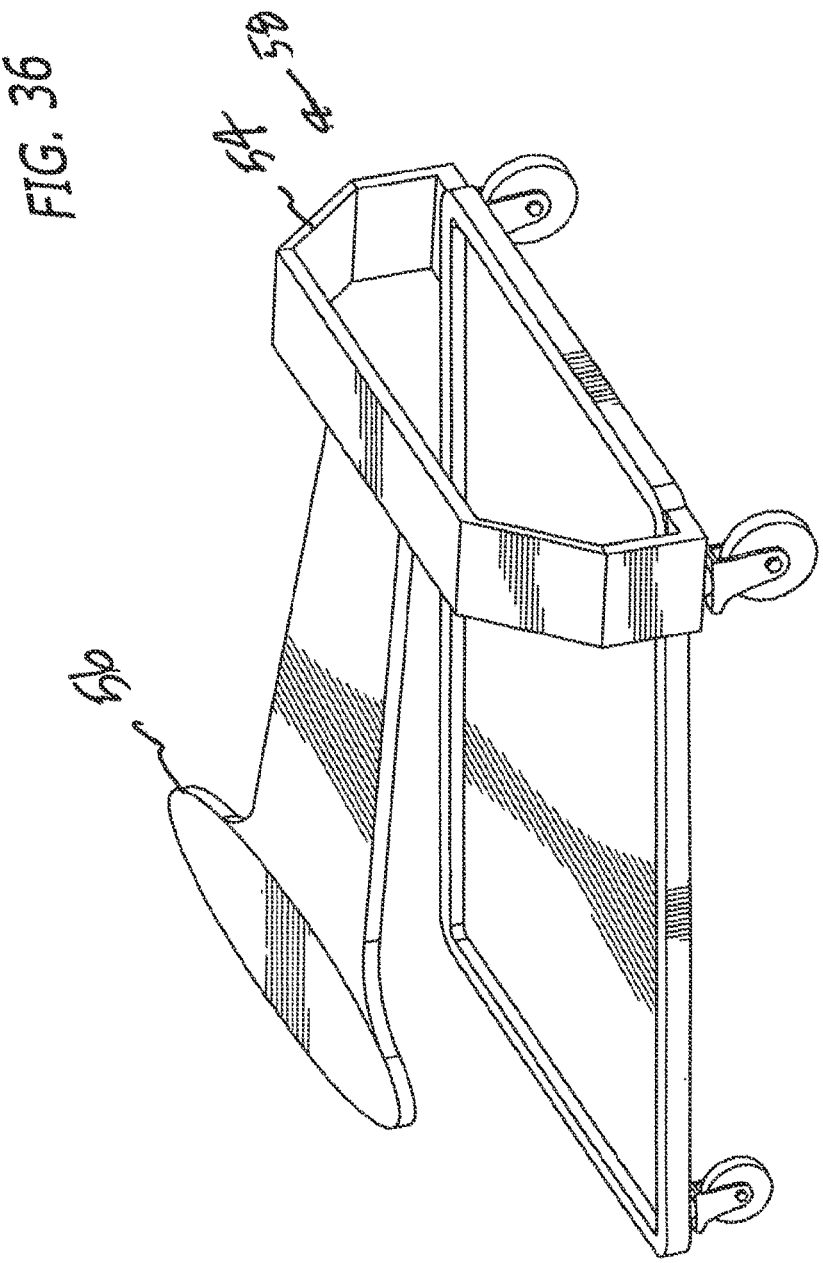
FIG. 36 is an isometric view of the lower portion of a stackable cart showing the base and attachment plate to which the upper basket is attached that will allow for stacking.
Figure 37:
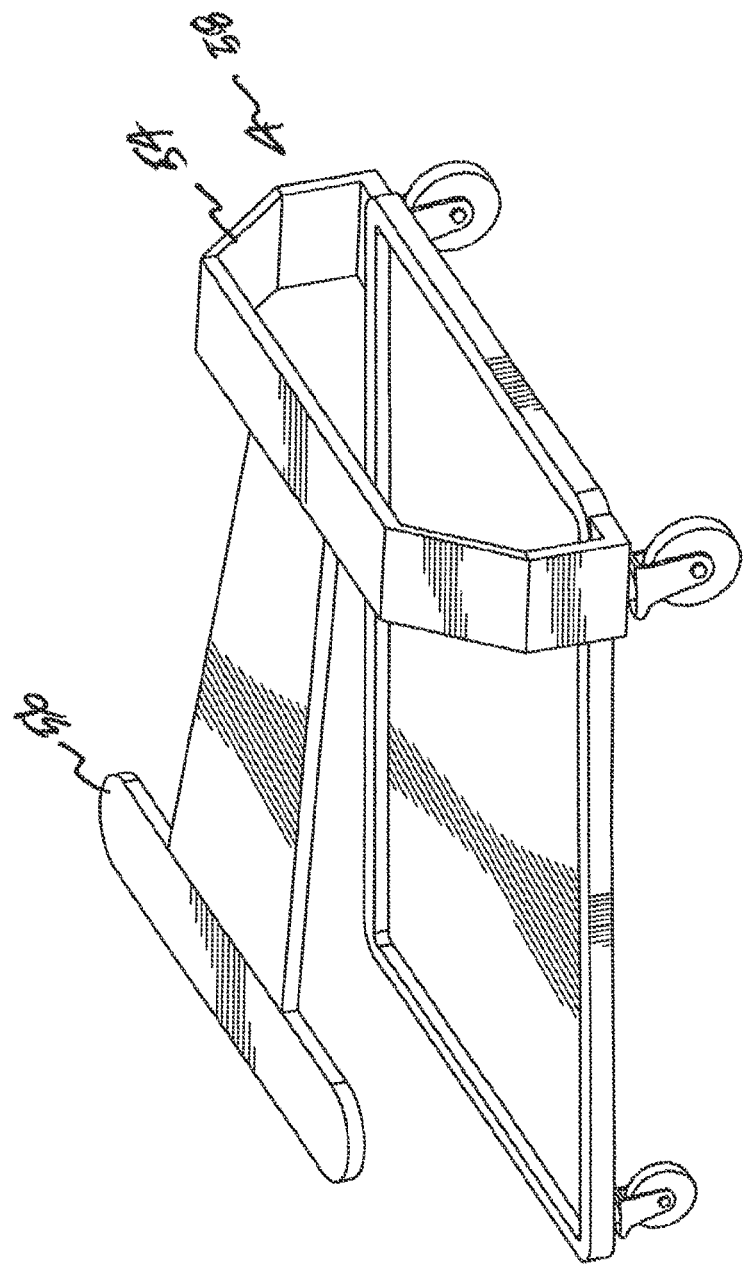
FIG. 37 is similar to FIG. 36, and shows another embodiment of the attachment plate.
Figure 38:
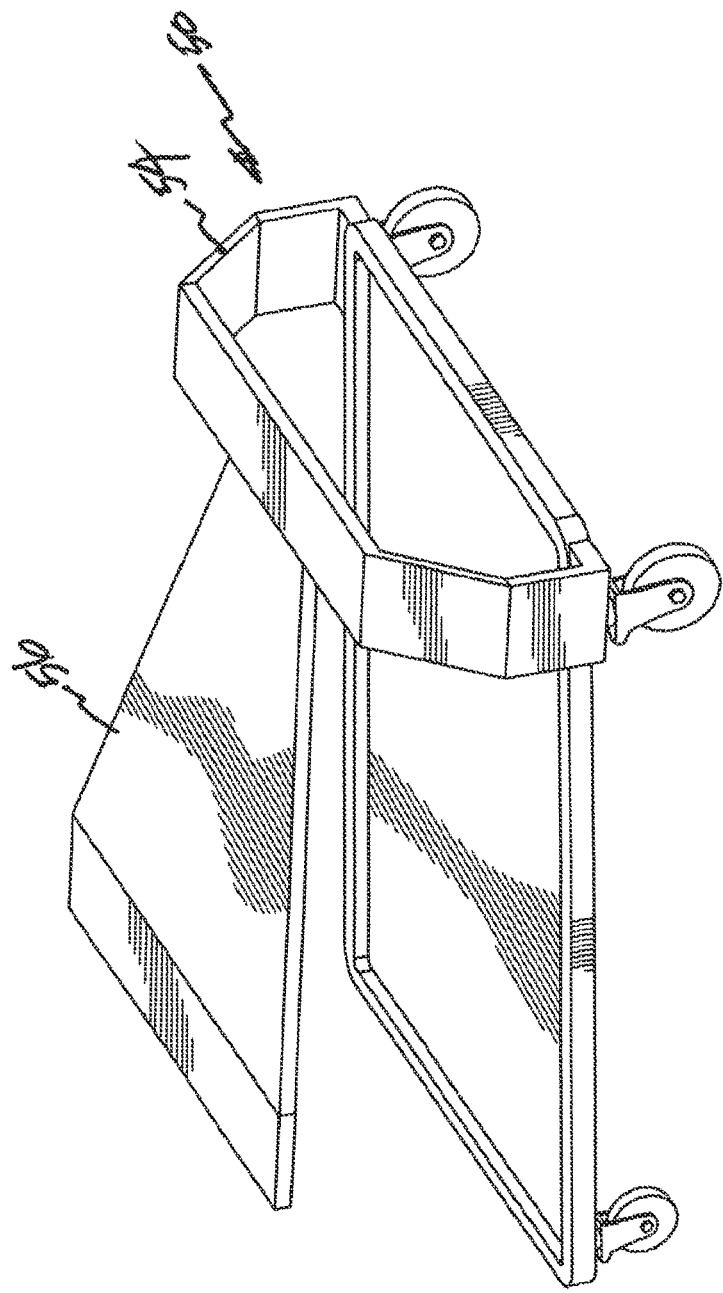
FIG. 38 is similar to FIGS. 37 and 38, and shows another embodiment of the attachment plate.

The cart shown can have large leg holes 42 to accommodate a small child riding in the "seat" portion of the basket 12, and can have a front panel 44 for notices, announcements and advertising. The cart 10 is equipped with handle supports 46a and 46b, to which are attached a rotatable handle 48, and as shown in FIGS. 32 and 33, can rotate through pre-determined locations to accommodate various height and comfort preferences for the cart users.

Figure 19:
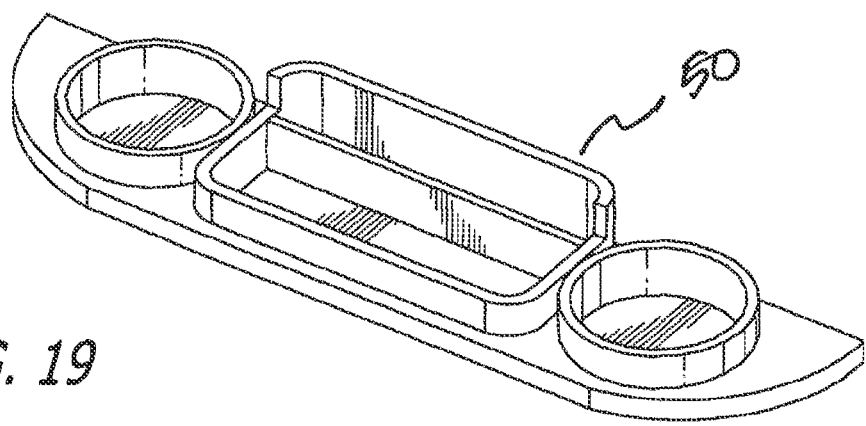
FIGS. 19 and 20 are isometric views of a preferred embodiment of a holder unit that is attachable to or near the handle portion of a shopping cart.
Figure 20:
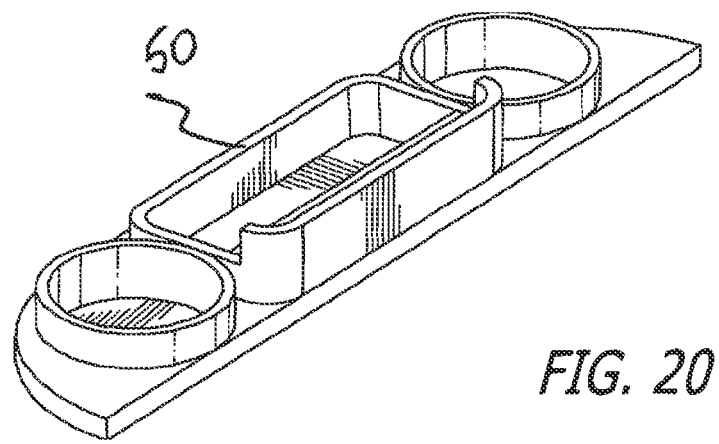
Figure 21:
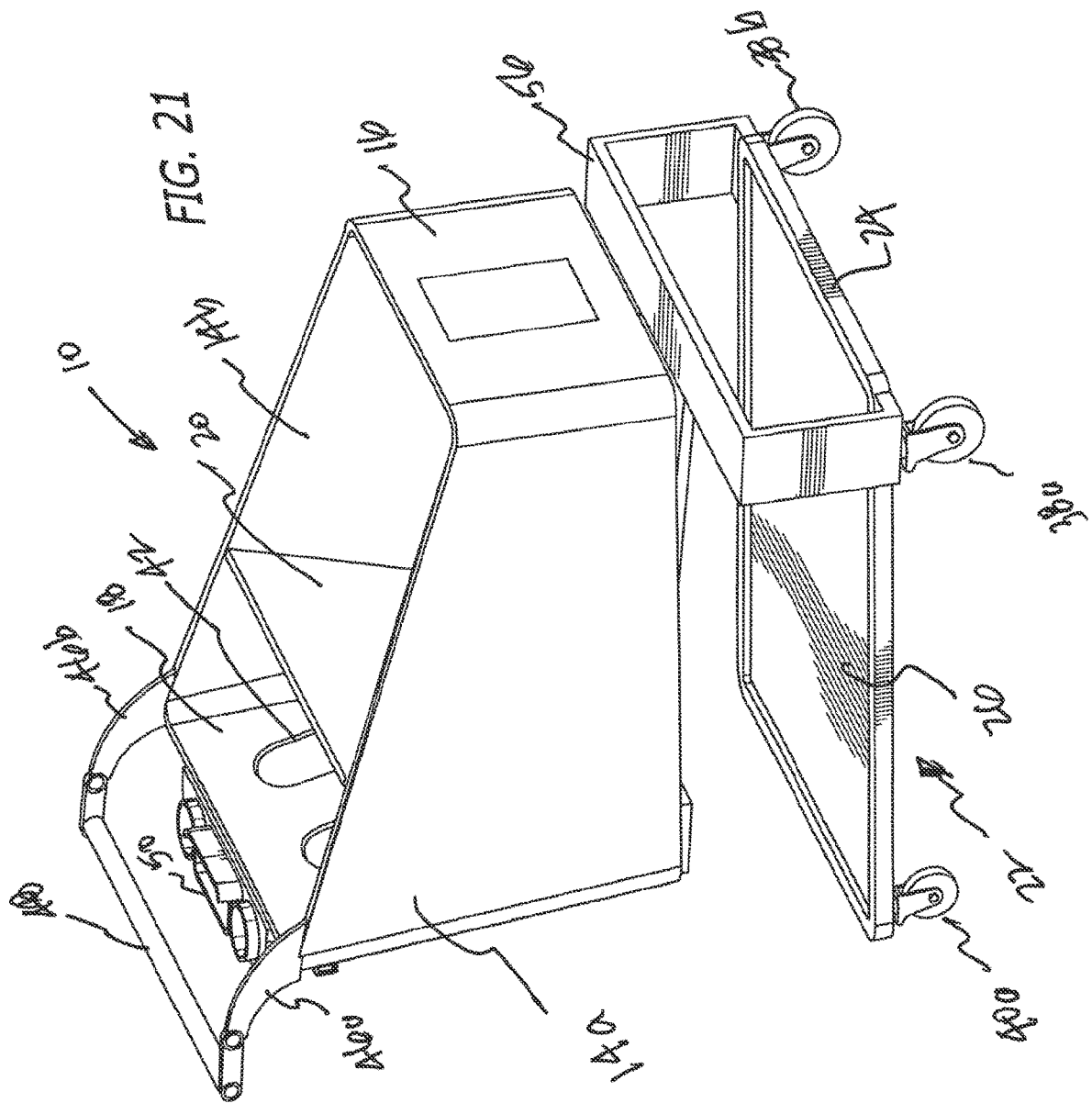
FIG. 21 is an isometric view of a stackable cart in a third preferred embodiment.
Figure 22:
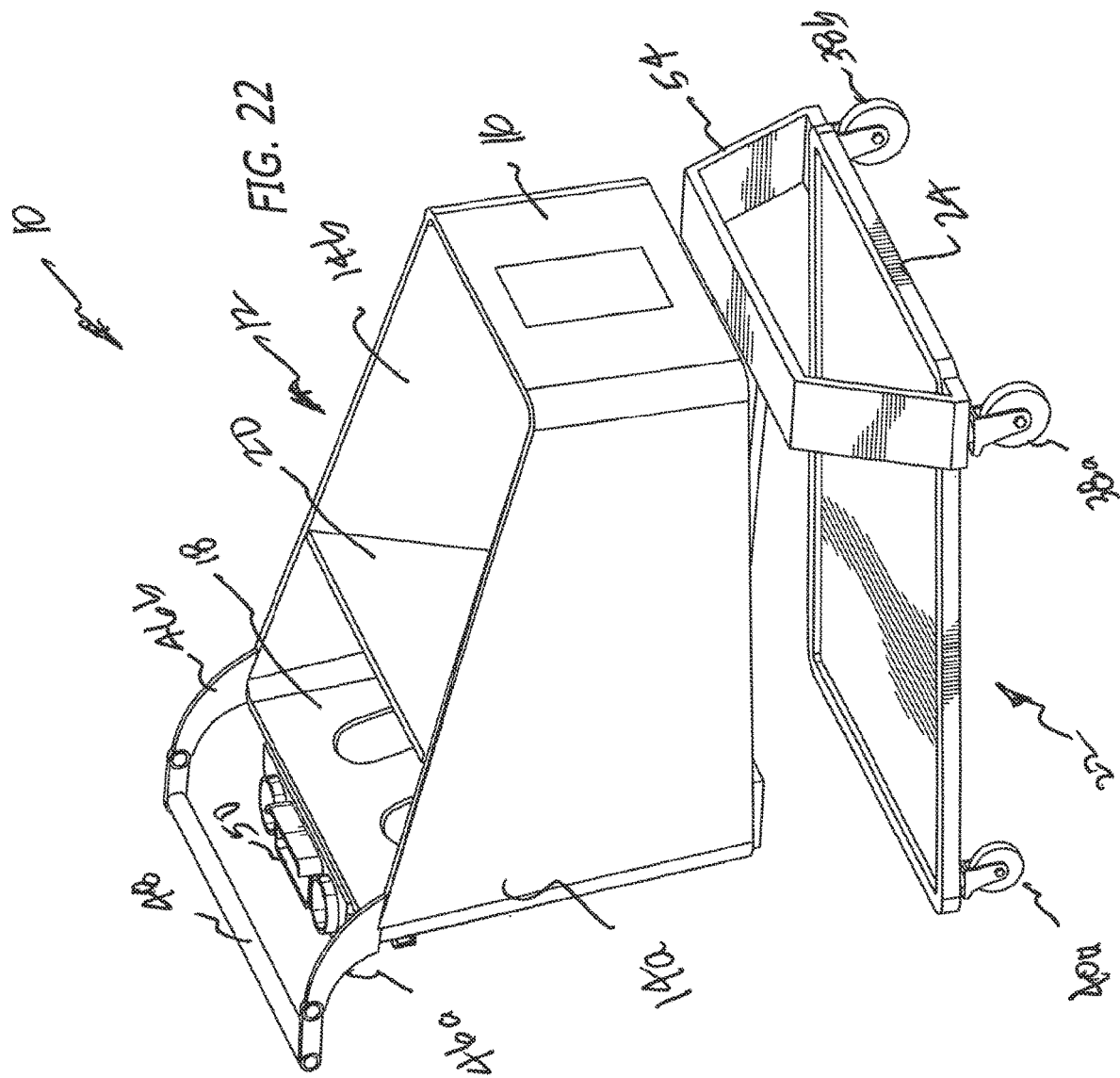
FIG. 22 is an isometric view of a stackable cart in a fourth preferred embodiment.
Figure 23:
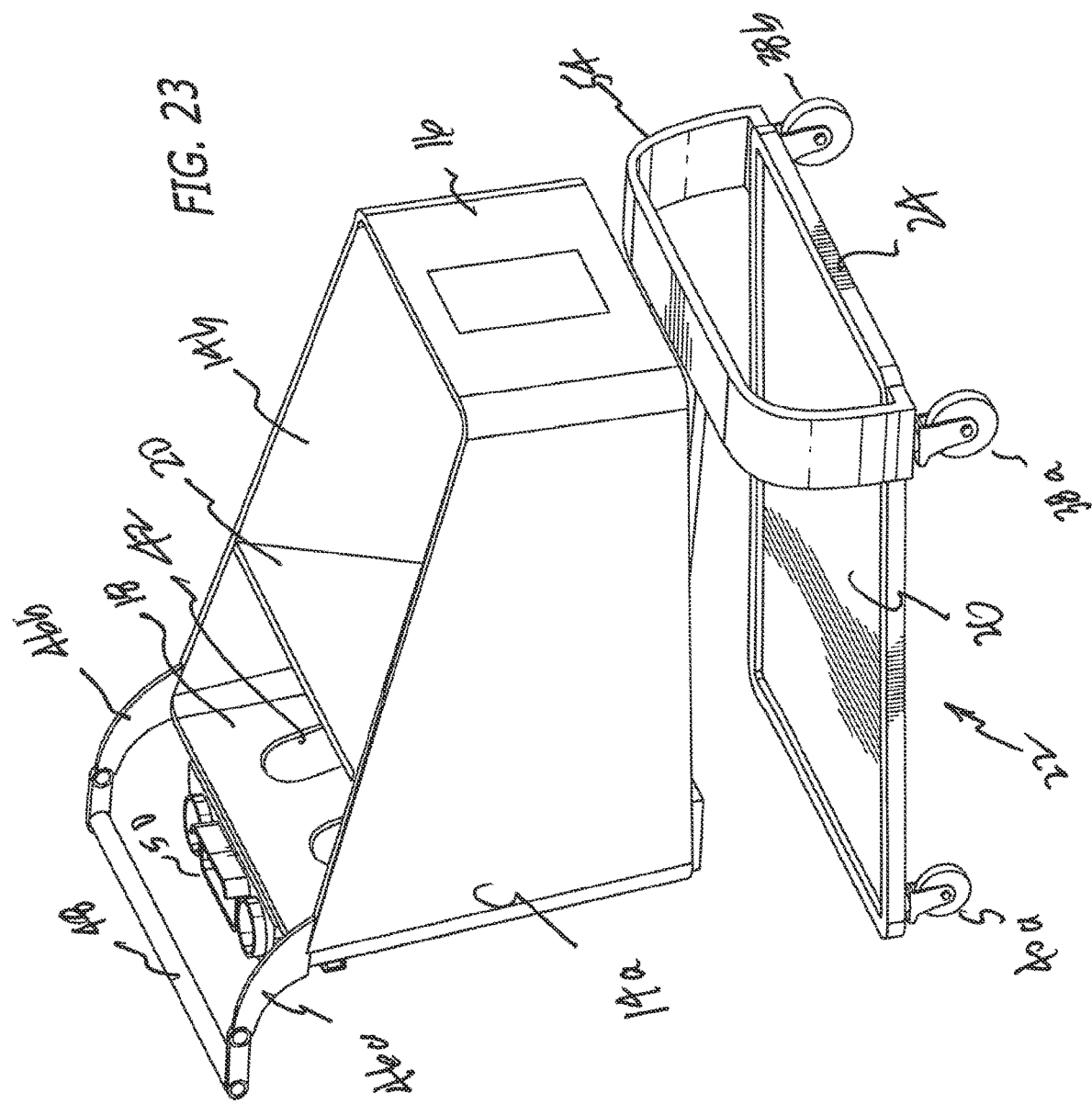
FIG. 23 is an isometric view of a stackable cart in a fifth preferred embodiment.

The cart 10 can also be equipped with a cup and accessory holder 50 (best seen in FIGS. 19 and 20), and hooks 52 that can be used to hang purses and plastic bags.

Figure 17:
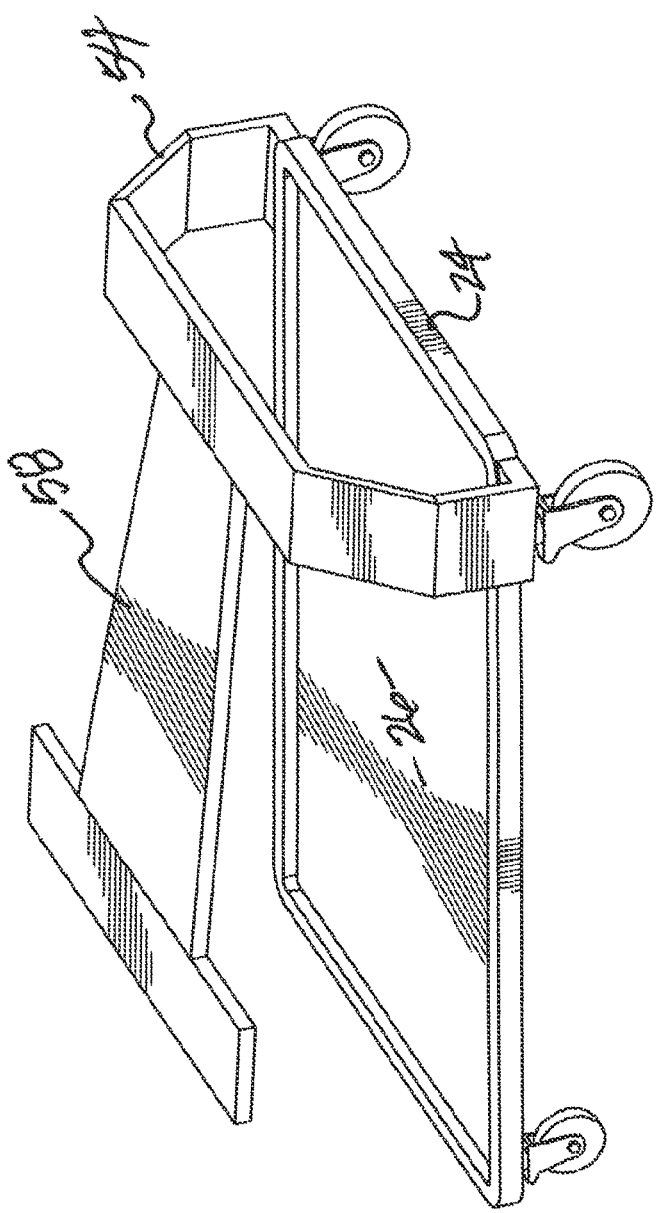
FIG. 17 is an isometric view of the lower portion only of a stackable cart in a second preferred embodiment.
Figure 18:
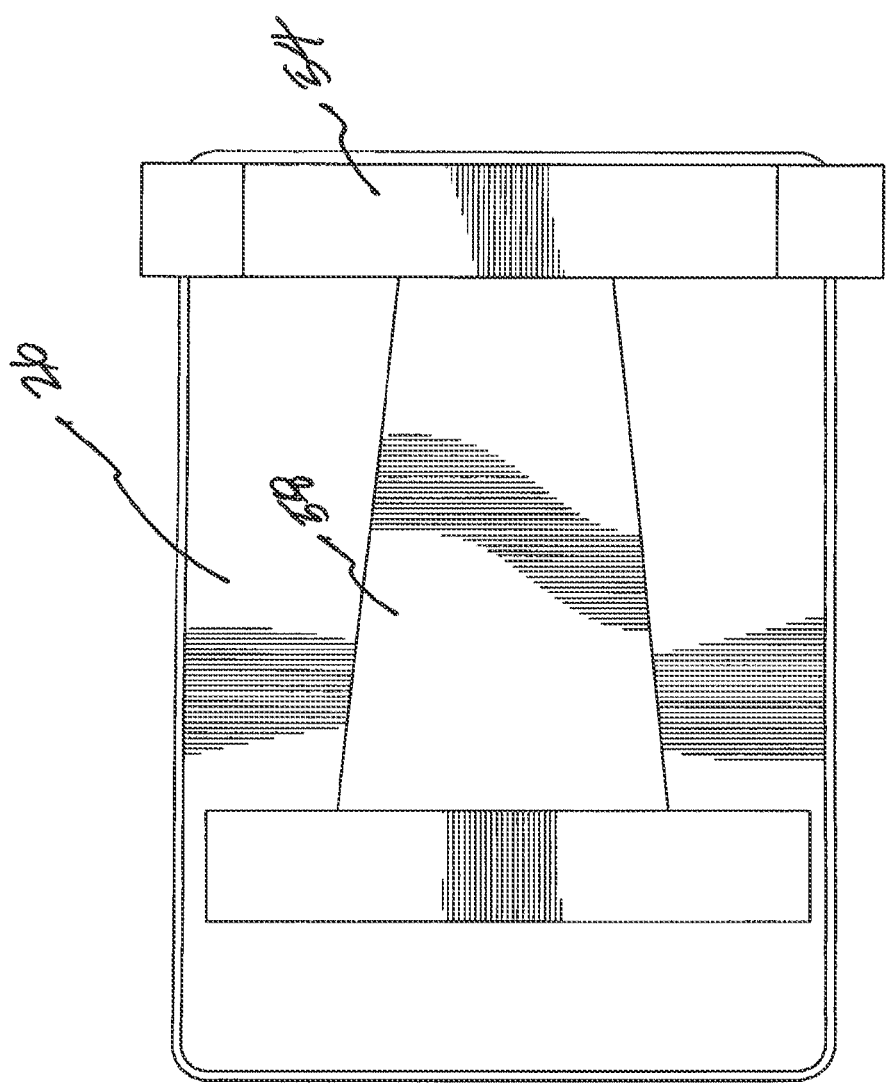
FIG. 18 is a top view of the lower portion only of a stackable cart in a second preferred embodiment.
Figure 24:
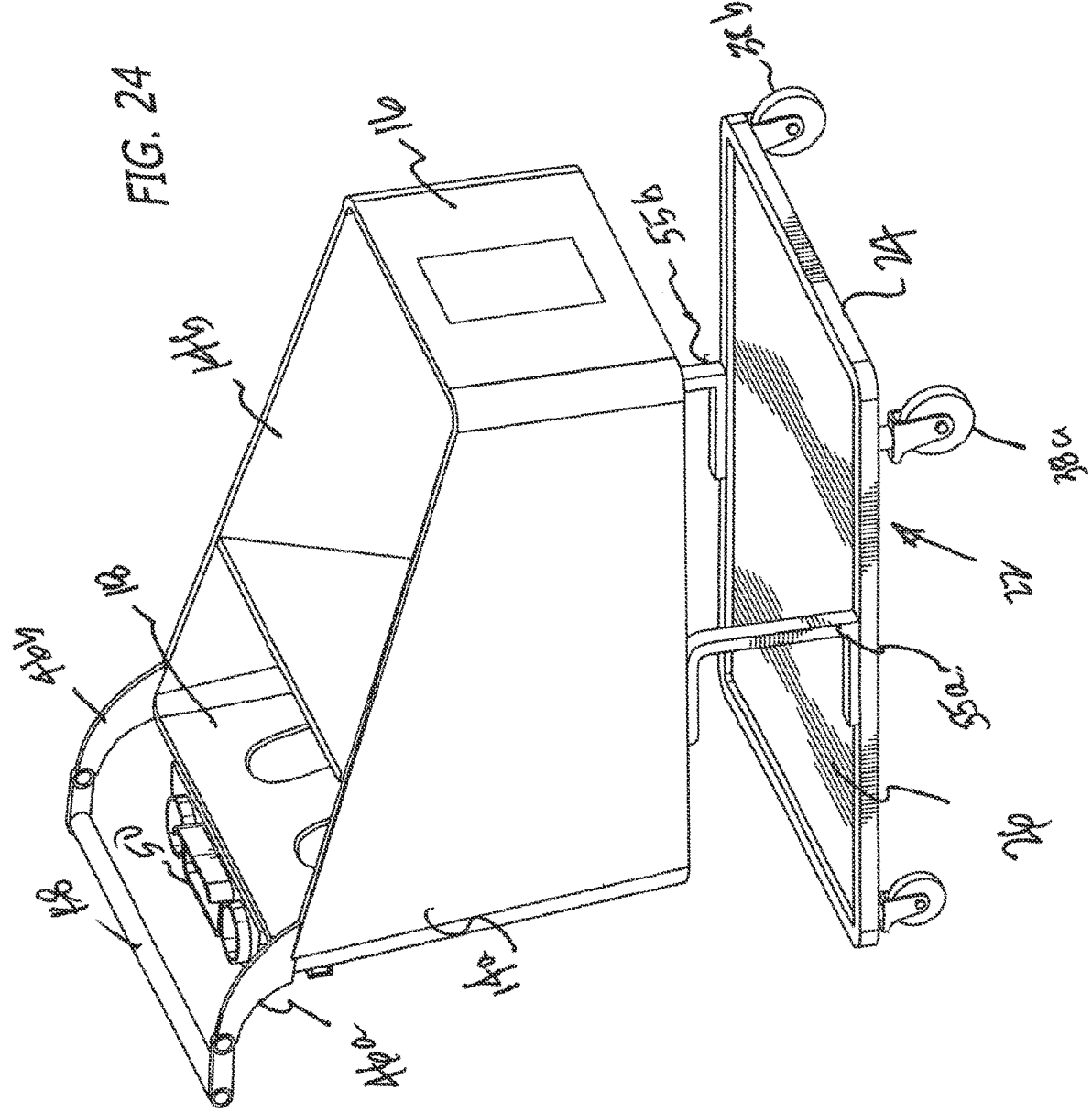
FIG. 24 is an isometric view of a stackable cart in a sixth preferred embodiment.
Figure 25:
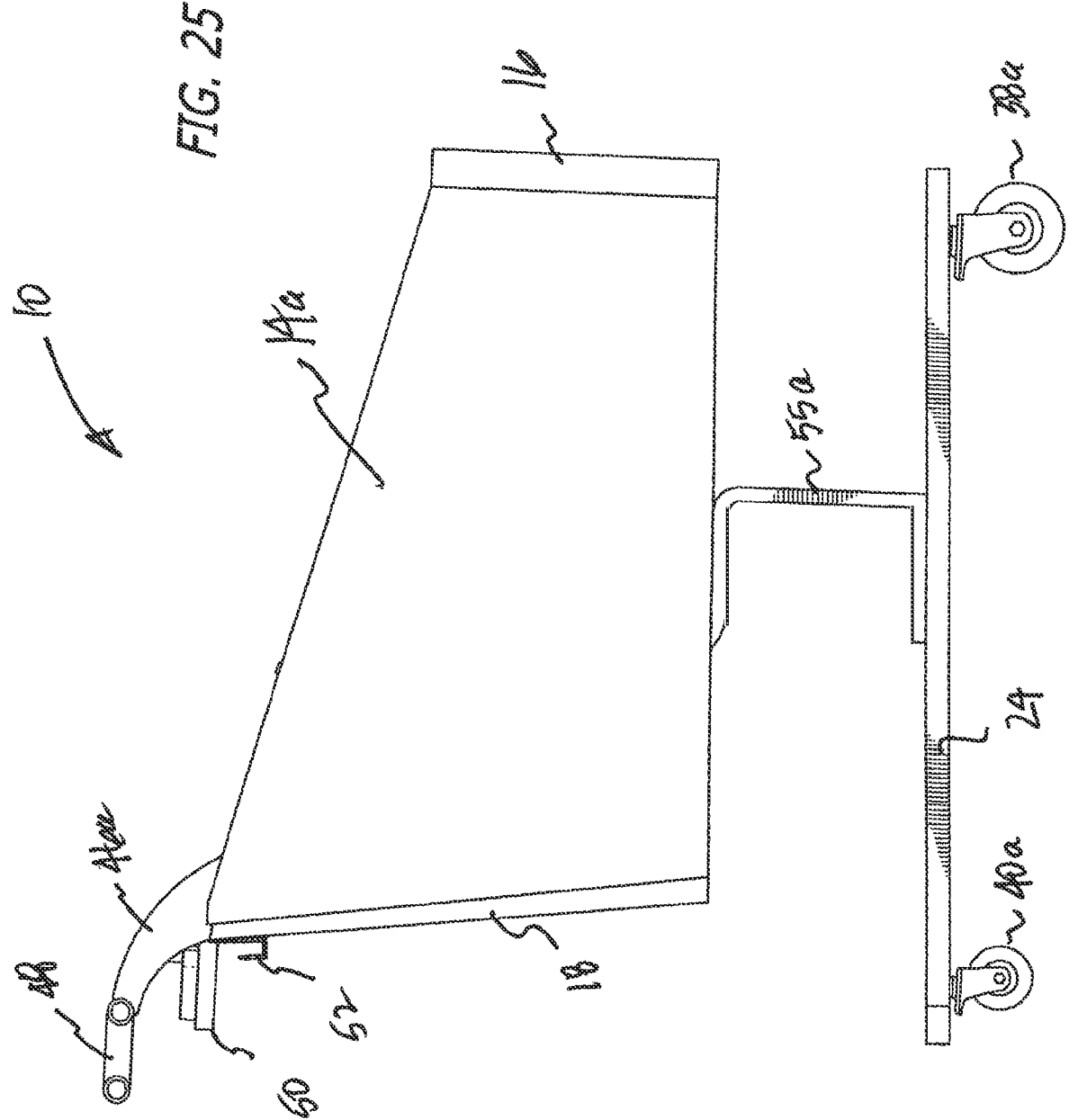
FIG. 25 is a right side view a stackable cart in a sixth preferred embodiment.
Figure 26:
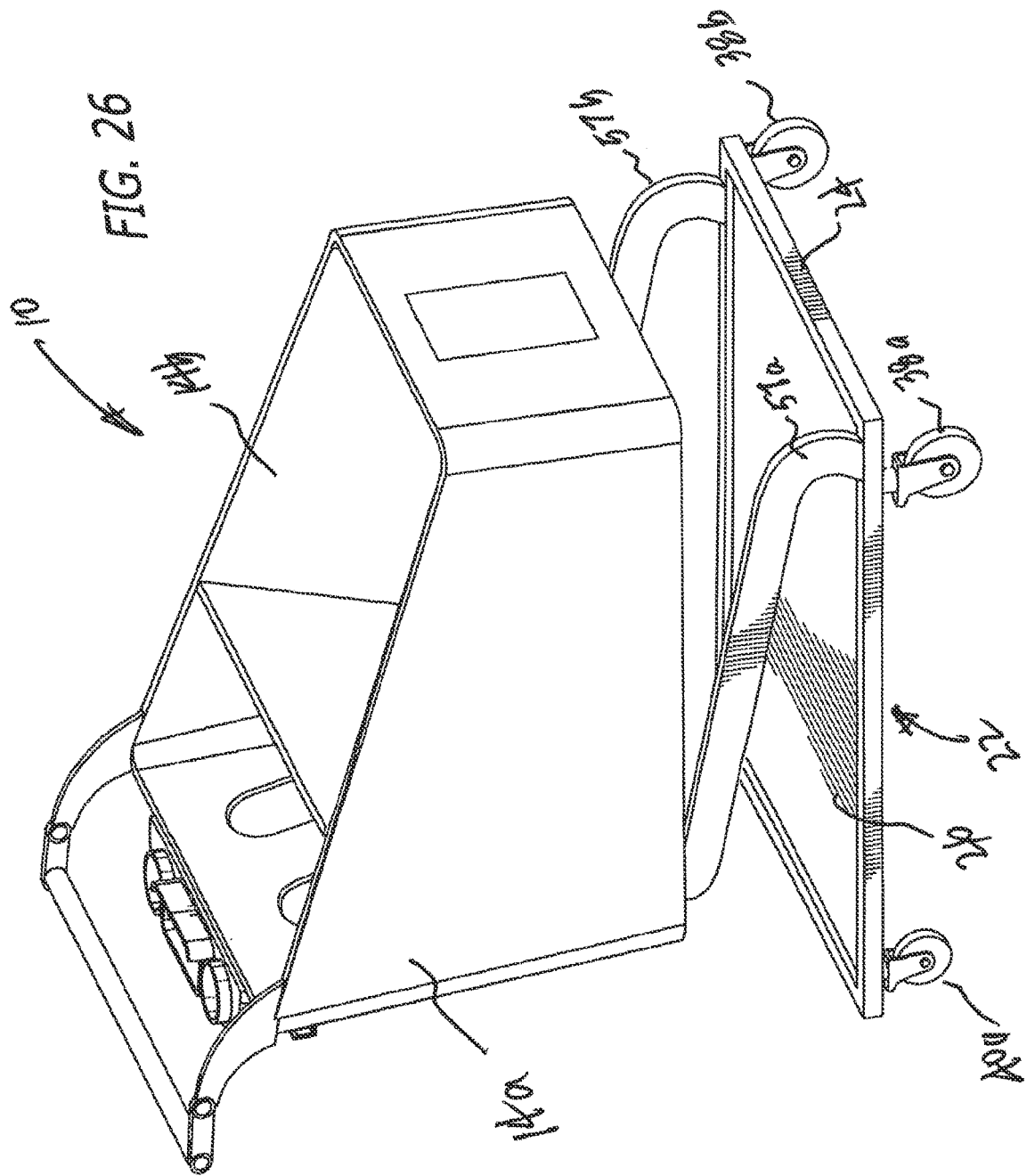
FIG. 26 is an isometric view of a stackable cart in a seventh preferred embodiment.
Figure 27:
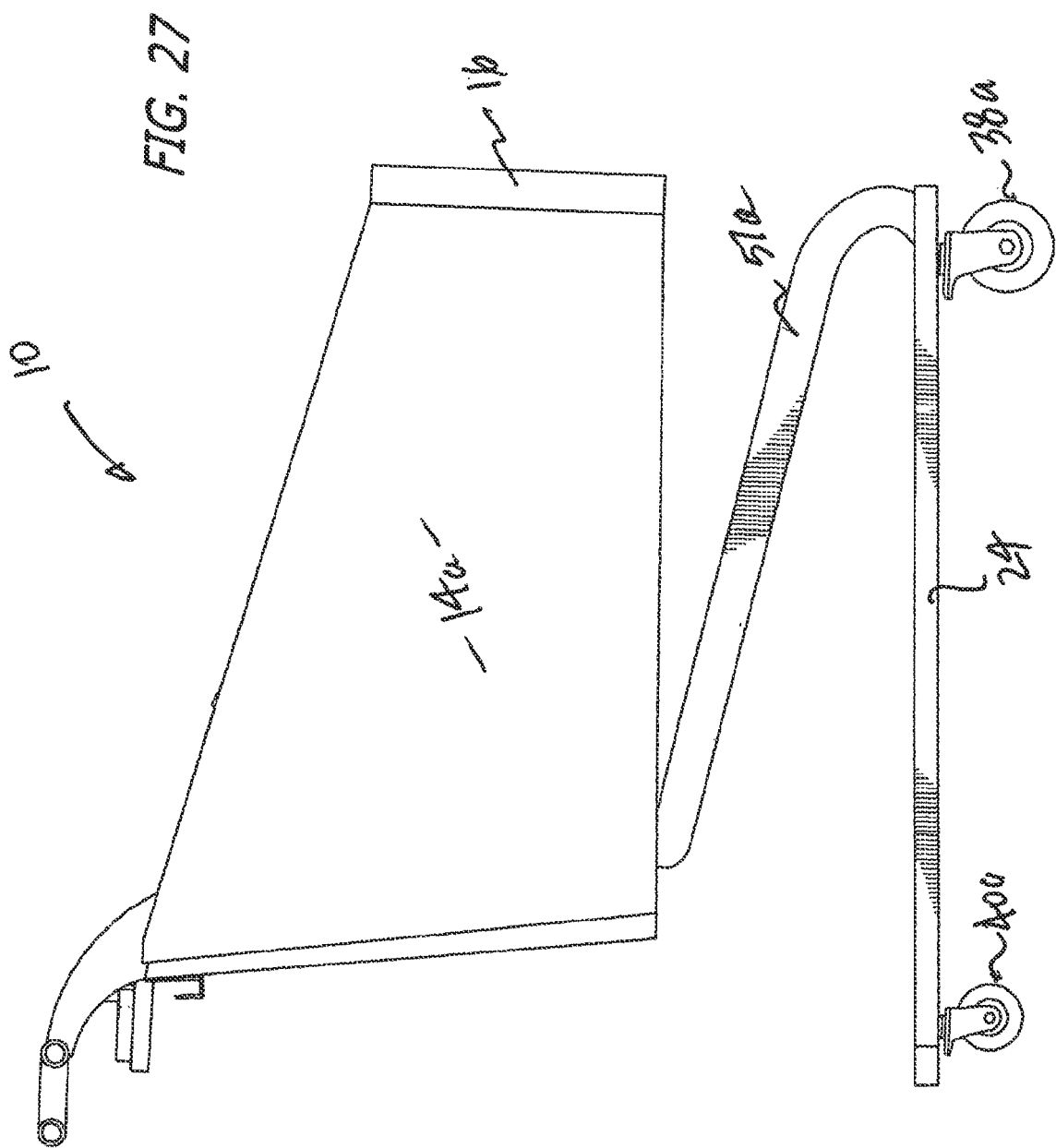
FIG. 27 is a right side view of a stackable cart in a seventh preferred embodiment.
Figure 28:
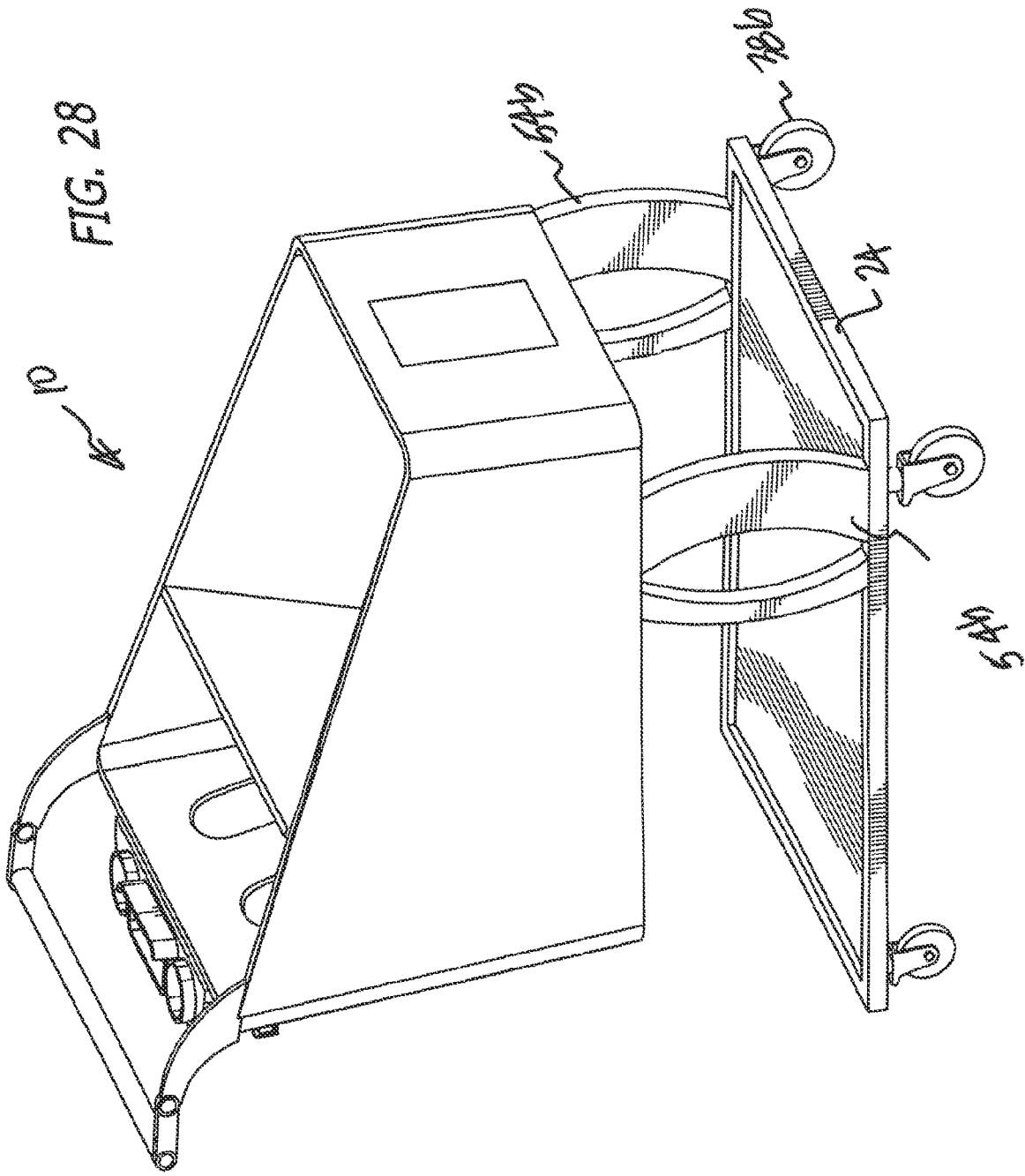
FIG. 28 is an isometric view of a stackable cart in an eighth preferred embodiment.
Figure 29:
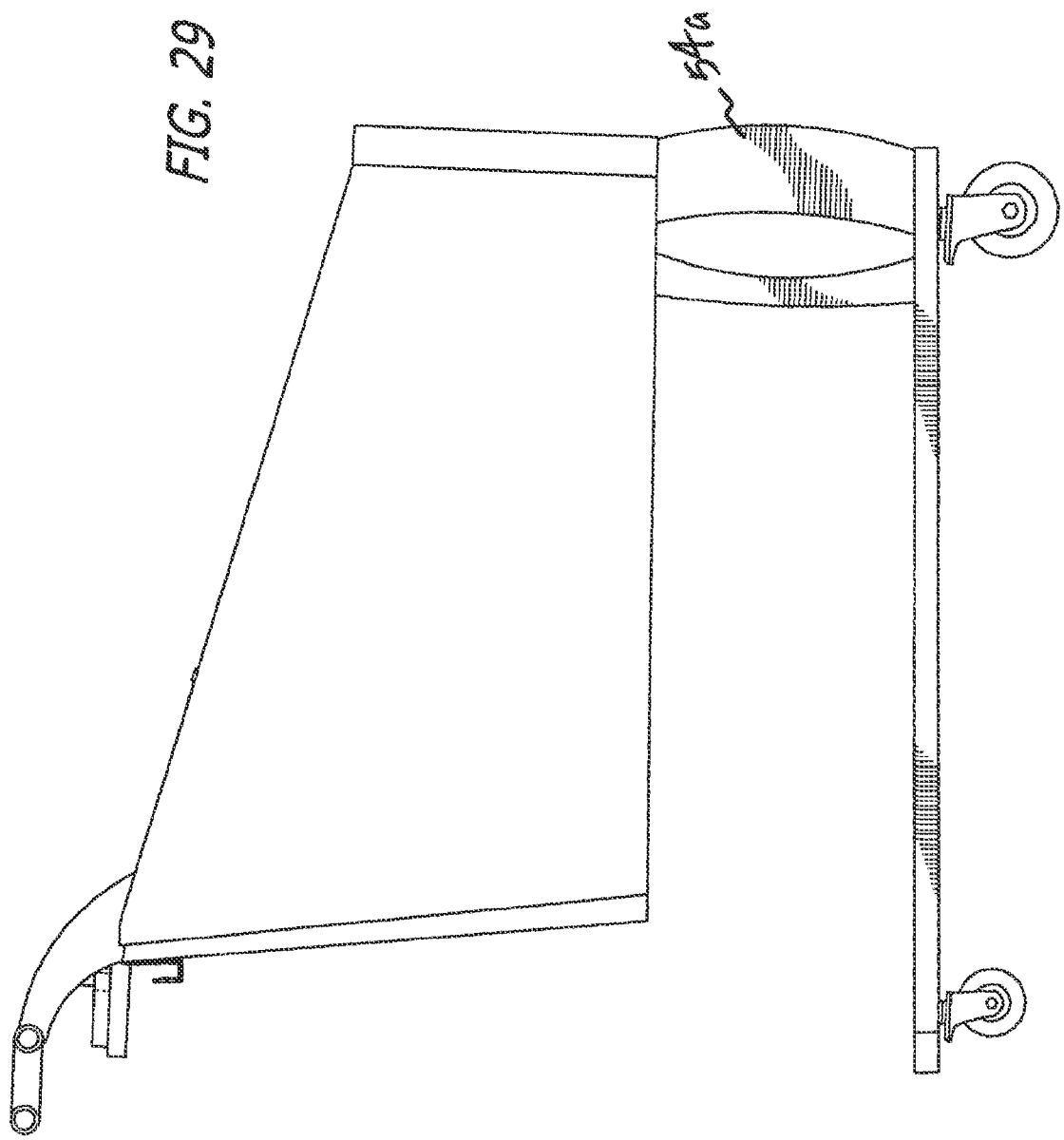
FIG. 29 is a right side view of a stackable cart in an eighth preferred embodiment.
Figure 30:
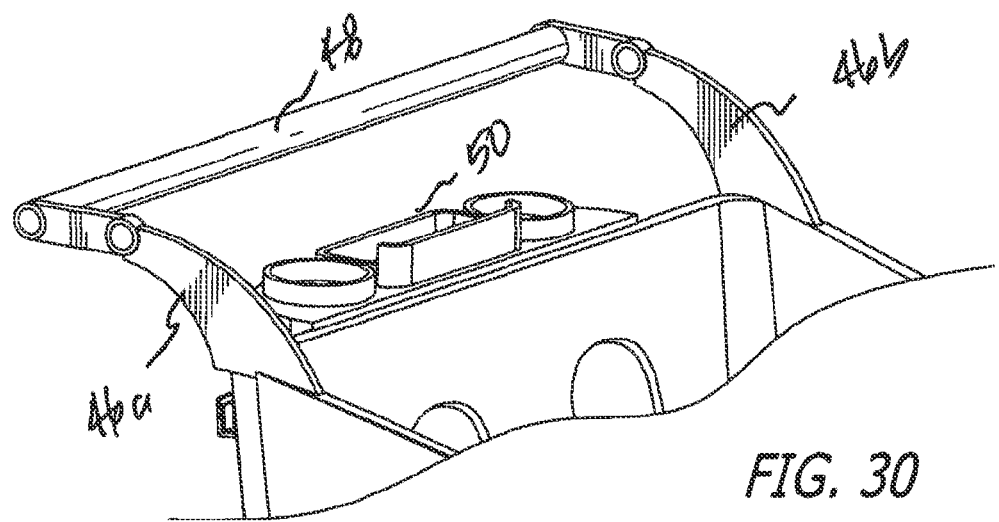
FIG. 30 is an isometric view showing the holder unit in position near the handle of a shopping cart, and the pivoting handle unit.
Figure 31:
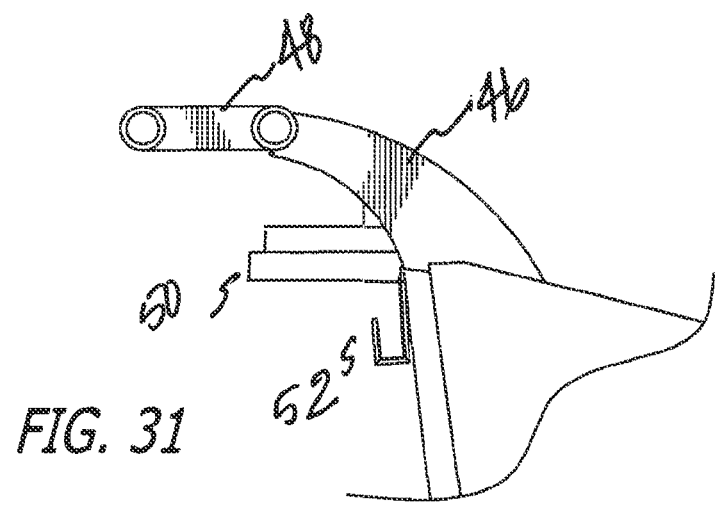
FIG. 31 is a side view showing the holder unit in position near the handle of a shopping cart, and the pivoting handle unit.

FIGS. 9 through 17 show a similar cart 10, but with a different structure for attaching the base frame 24 to the basket 12, which maintaining the preferred nesting and back access to lower shelf benefits described above. In this embodiment, the support member 54 is a single structural element comprising a front yoke 56 the two legs of which are attached to the base frame 24. As seen in FIGS. 17 and 18 has a T-bone shaped support member 58 that extends from the yoke 54 toward the rear of the cart 10, where it is attached to the underside of the basket 12. FIGS. 24 and 25 show a different arrangement in which the basket 12 is attached to the base frame 22 by means of a pair of legs 55a and 55b. Also seen in FIGS. 24 and 25, the front wheels 38a and 38b are not attached directly to the base frame 24. In order to maintain the differential distance between the front wheels compared to the distance between the rear wheels, the base frame 24 can be wider at the front than the back, or the rear wheels can be attached to the base frame 24 or the base platform 26 more toward the center line of the cart 10. There are, of course, other ways to size and shape the base frame 24, the base platform 26 and/or the placement of the front and rear wheels in order to maintain the preferred relative distance differentials. FIG. 26 shows another embodiment in which the basket 12 is attached to the base 22 by means of side arms 57a and 57b.

FIGS. 29 to 31 and 36 to 38 show different configuration of the support member 58 by which the basket 12 can be attached to the base frame 22 and still achieve the benefits described above. These Figures show that the attachment means can be of many different shapes, sizes, location and of any suitable material of sufficient strength and rigidity that the basket portion of the cart does not sink lower than preferred when the cart basket 12 is fully loaded. On the other hand, some flexibility may be desired so that it provides a shock absorber or cushioning effect if a child is in the cart seat. As carts are not nested or stacked unless empty, however, any flexibility will not adversely affect that operation.

Depending on customer preference, the base frame (or shelf) 24 can be square or rectangular to provide even greater carrying capability. The relative sizes and relationship of the basket 12 and base frame 24 can adjusted to fit store and/or customer preference for a larger bottom shelf space and more "headroom" in that shelf.

Figure 39:
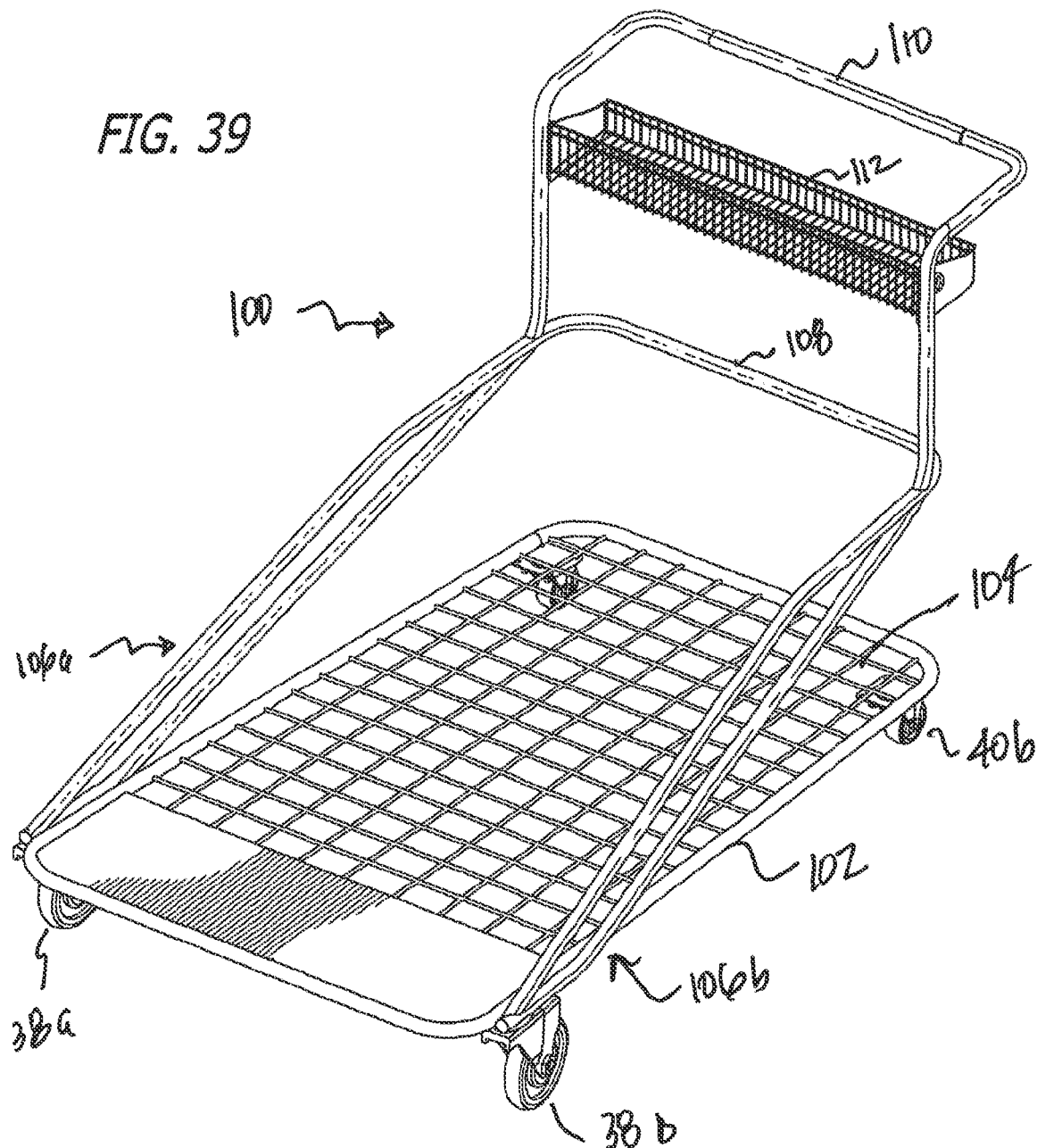
FIG. 39 is an isometric view showing another type of stackable cart (or trolley), this cart having a bottom shelf but no attached large basket as in the "grocery store" type carts show in preceding figures, more intended for use at "big box" stores and the like. This cart has a small basket attached to the handle portion of the cart.

FIG. 39 shows a different type of cart 100 that does not have a basket. Rather this cart 100 is more adapted for use in "big box" stores. It comprises a base frame 102, a base shelf 104 that is preferably constructed of sturdy cross-hatched wire to reduce weight and cost without sacrificing utility. Side struts 106a and 106b extends from the front portion of the base from 102 diagonally upwardly and rearwardly to form a rear bar 108 and a handle 110. In this embodiment, a small wire basket 112 is attached between the struts 106a and 106b to hold smaller items.

Figure 40:
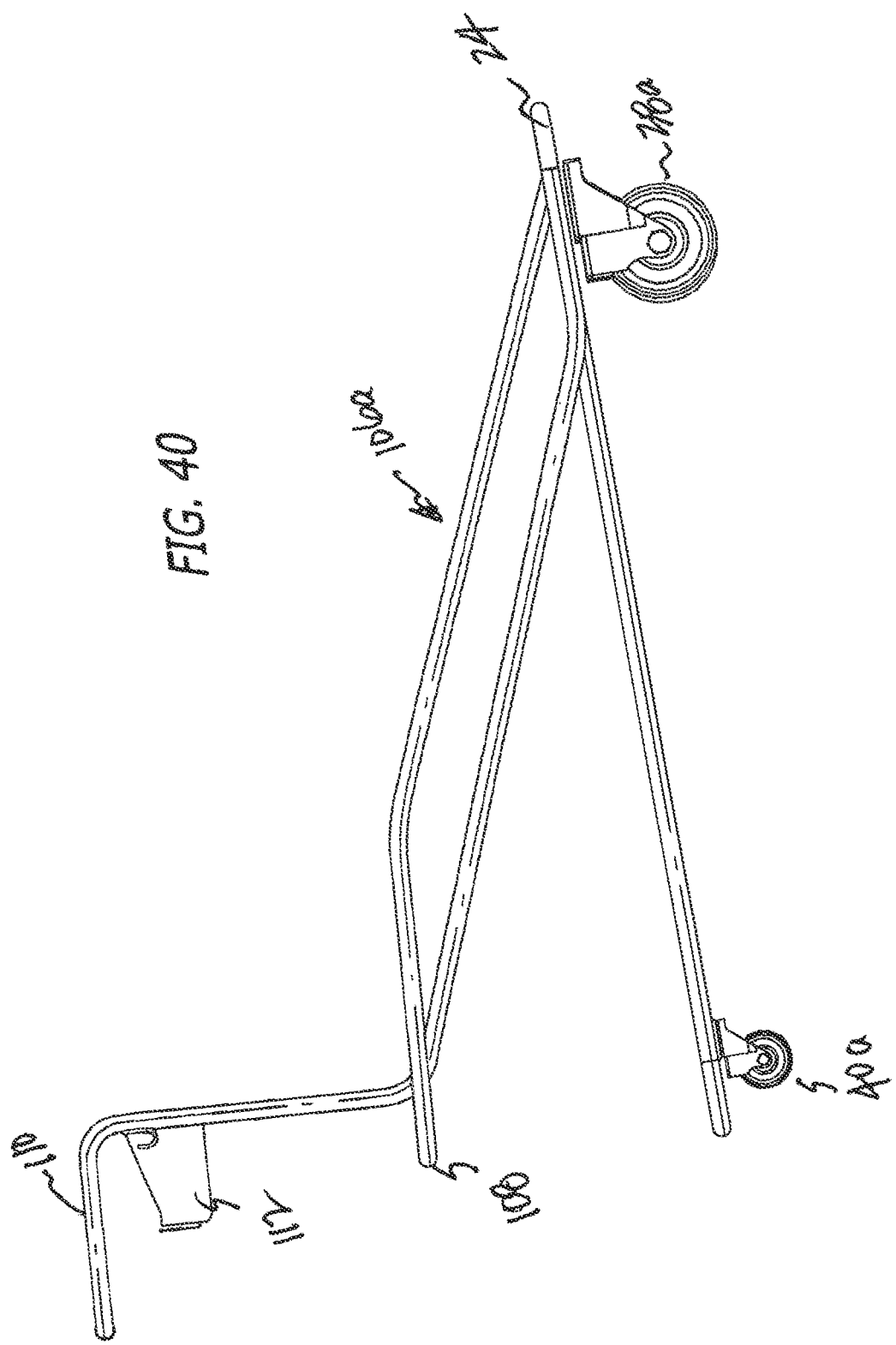
FIG. 40 is a side view of the cart shown in FIG. 39.
Figure 41:
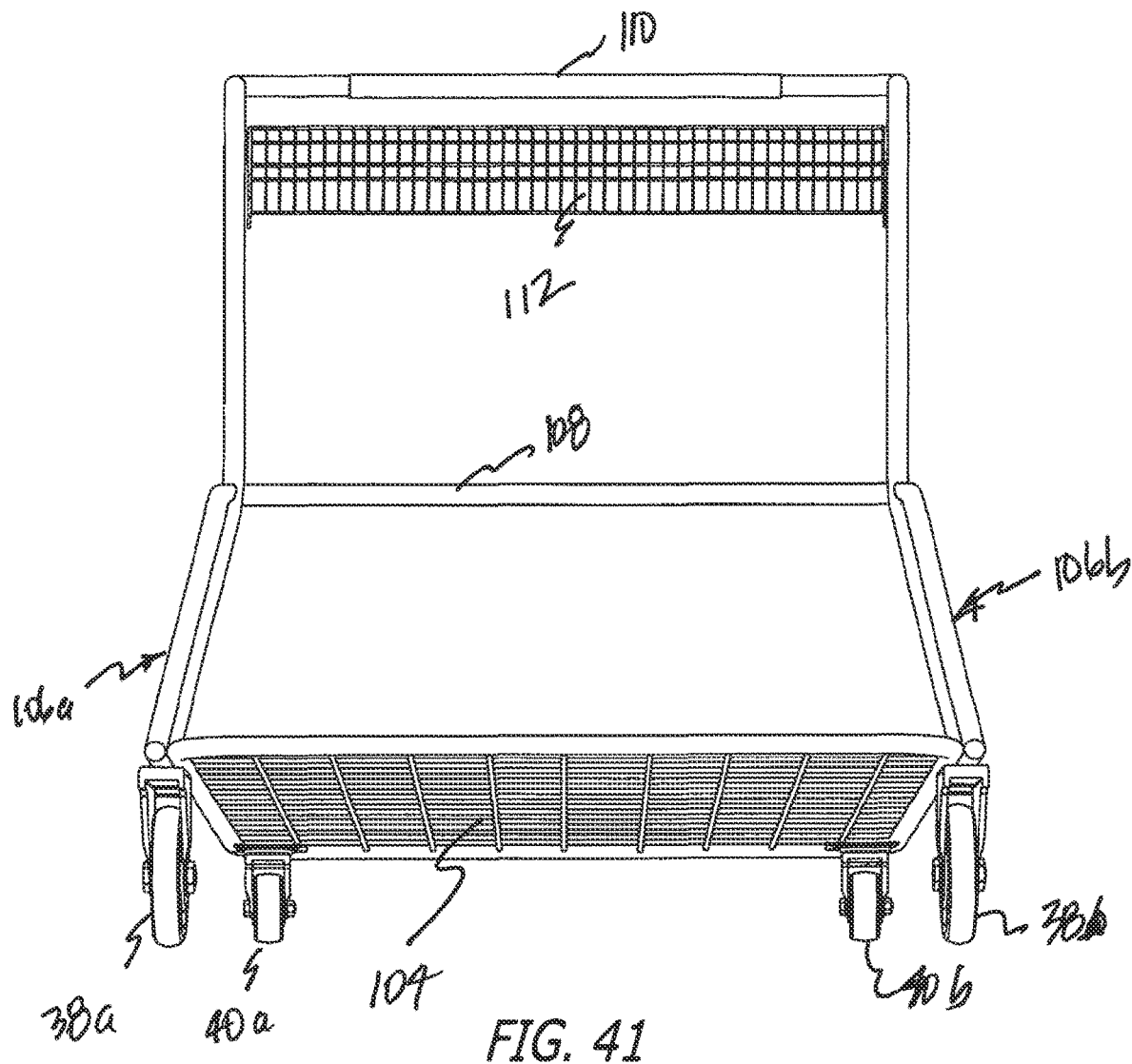
FIG. 41 is a rear isometric view of the cart shown in FIG. 39.
Figure 42:
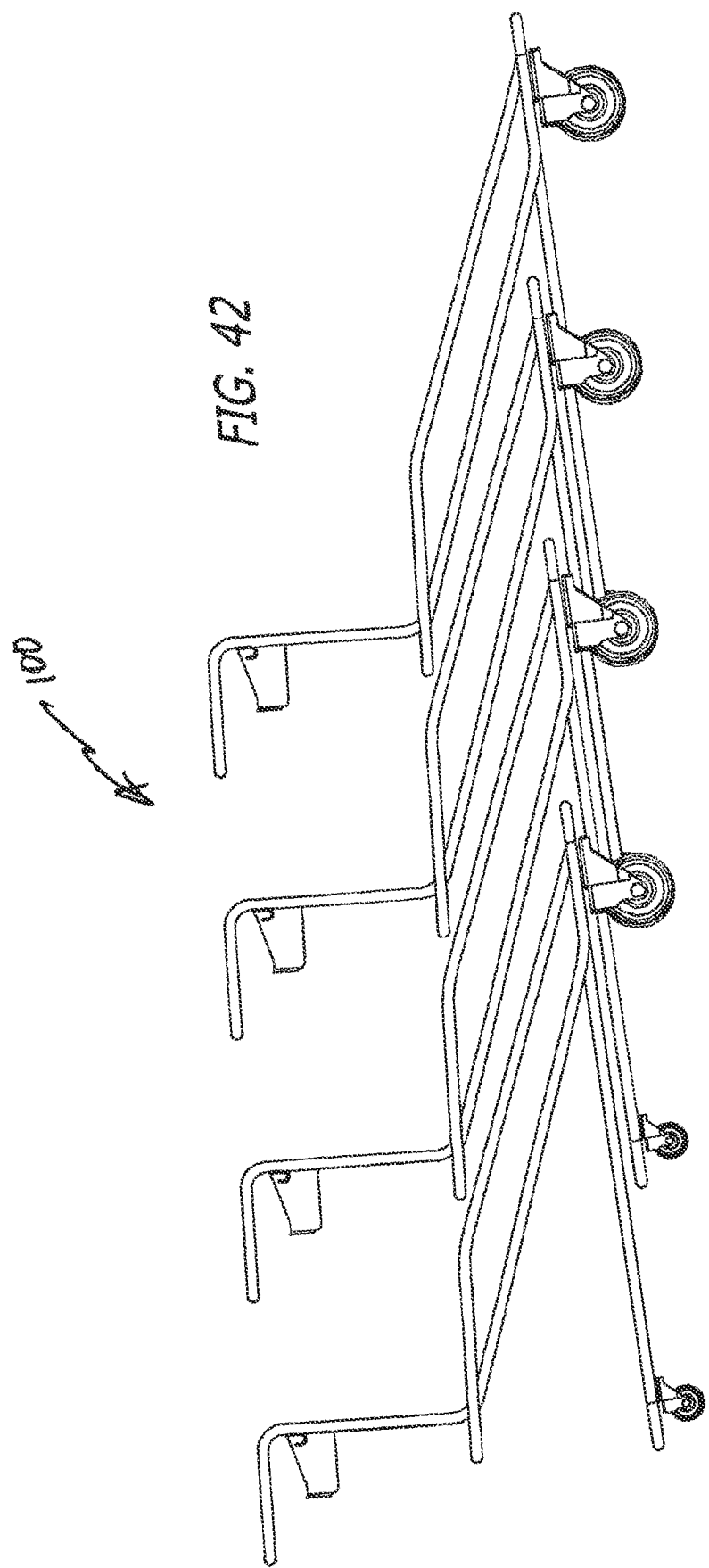
FIG. 42 is a side view of the cart shown in FIG. 39, this view showing how multiple carts stack together in telescoping fashion.

As best seen in FIGS. 40 and 41, this cart 100 also has front wheels 114a and 114b, and rear wheels 116a and 116b in which the lateral distance between them respectively allows the front wheels to slide over and outside the rear wheels in a nested-cart arrangement, and the front of the base frame 102 is higher in front, and lower in back, to allow the front of the base frame 102 to slide above the back of the base frame 102 in adjacent carts when in a nested arrangement. All this is shown in FIG. 42.

Figure 43:
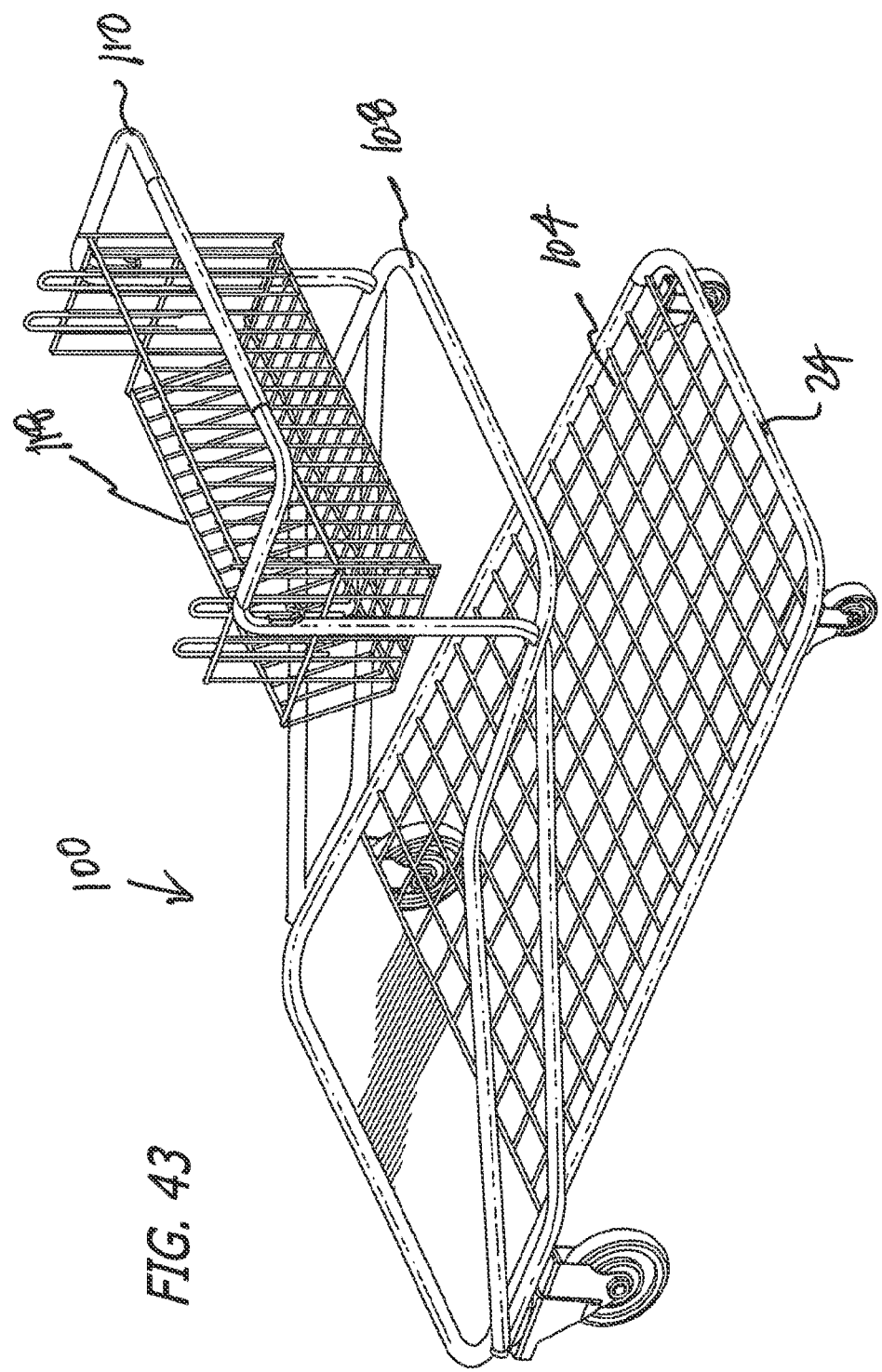
FIG. 43 is an isometric view showing the cart similar to that shown in FIG. 39, but with a different type of basket attached to the handle, and different rear frame configuration. There are a myriad of ways in which the frame and basket arrangement can be configured without departing from the inventive concepts here in described, depicted and claimed.
Figure 44:
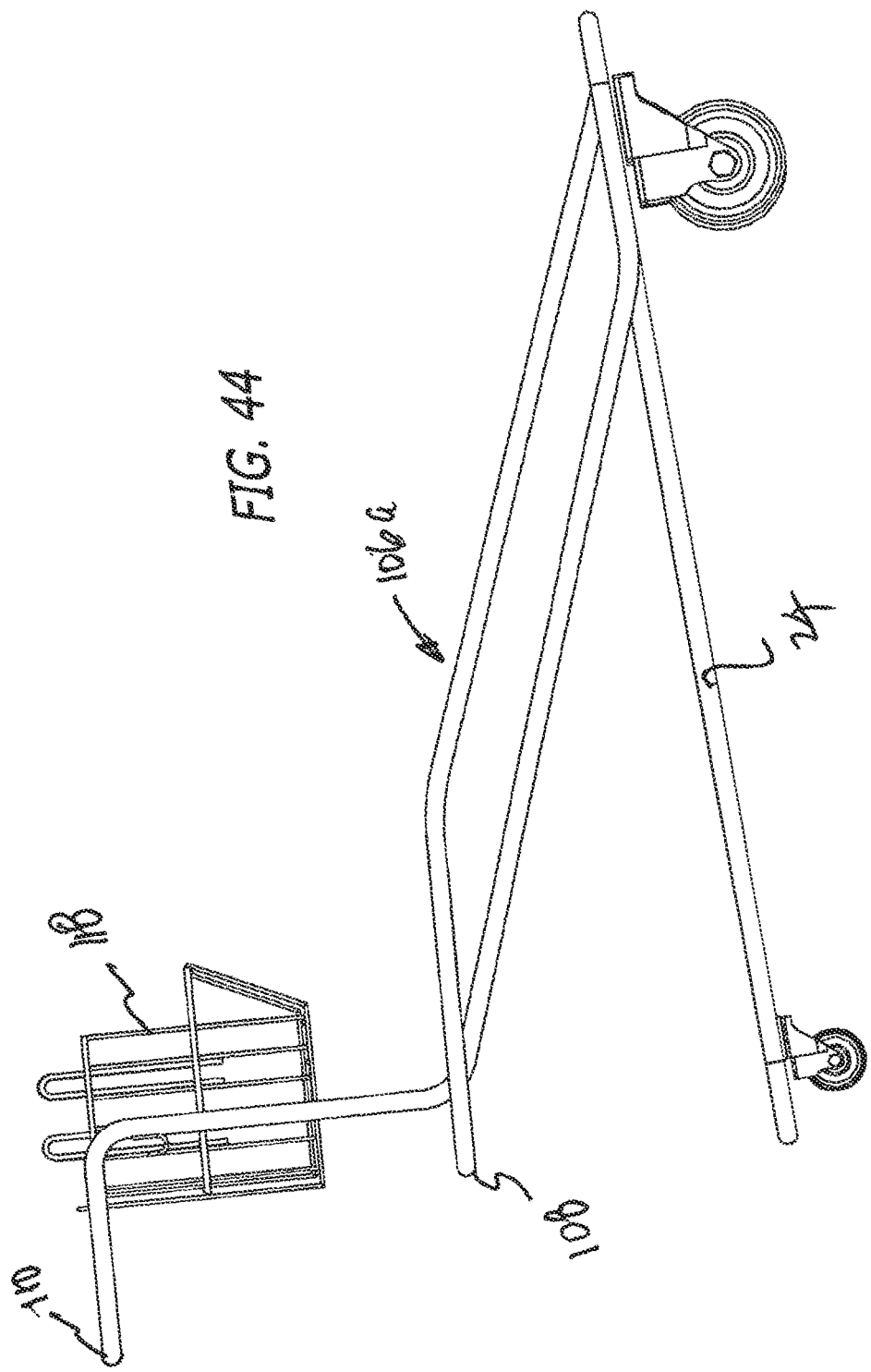
FIG. 44 is a side view of the cart shown in FIG. 43.
Figure 45:
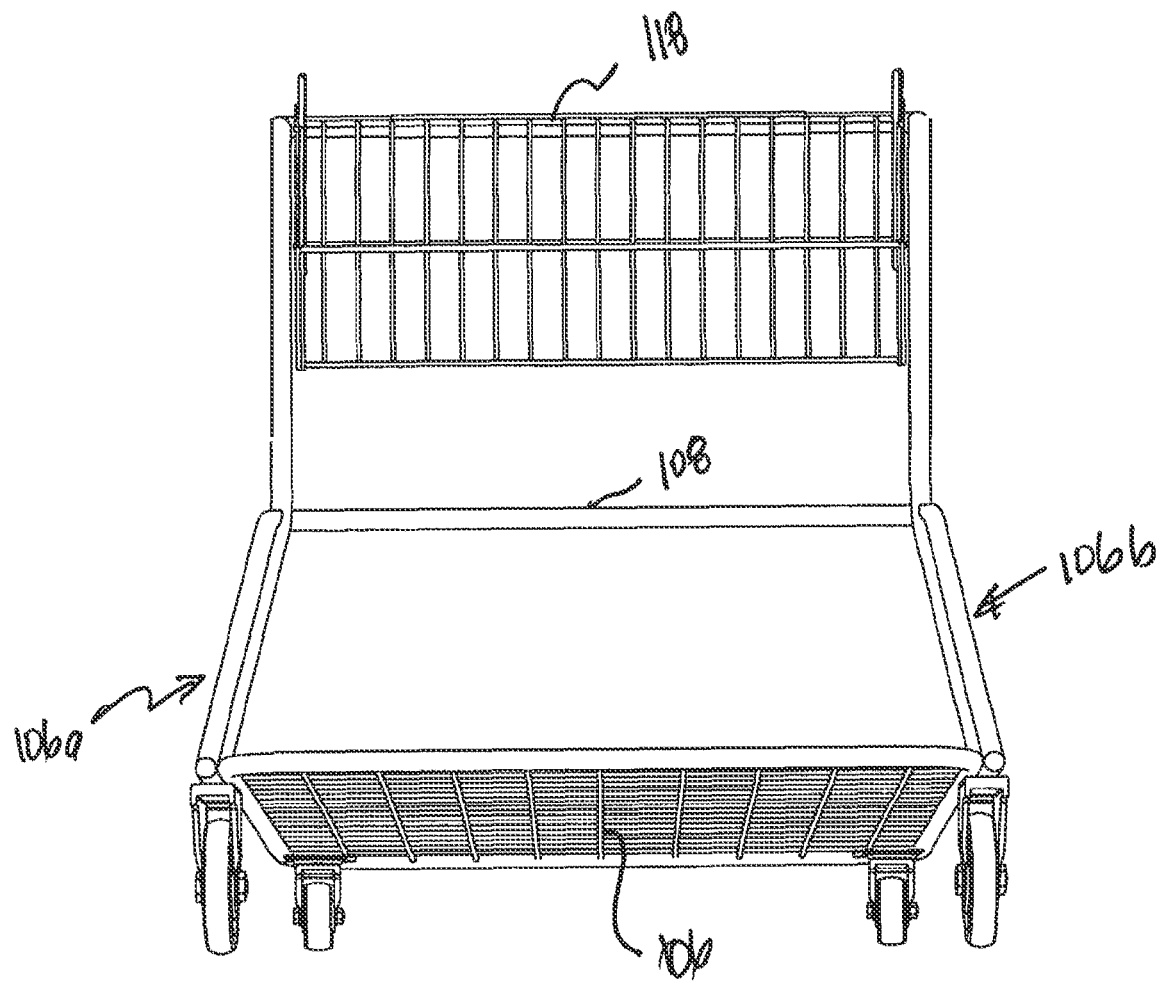
FIG. 45 is an isometric rear view of the cart shown in FIGS. 43 and 44.
Figure 46:
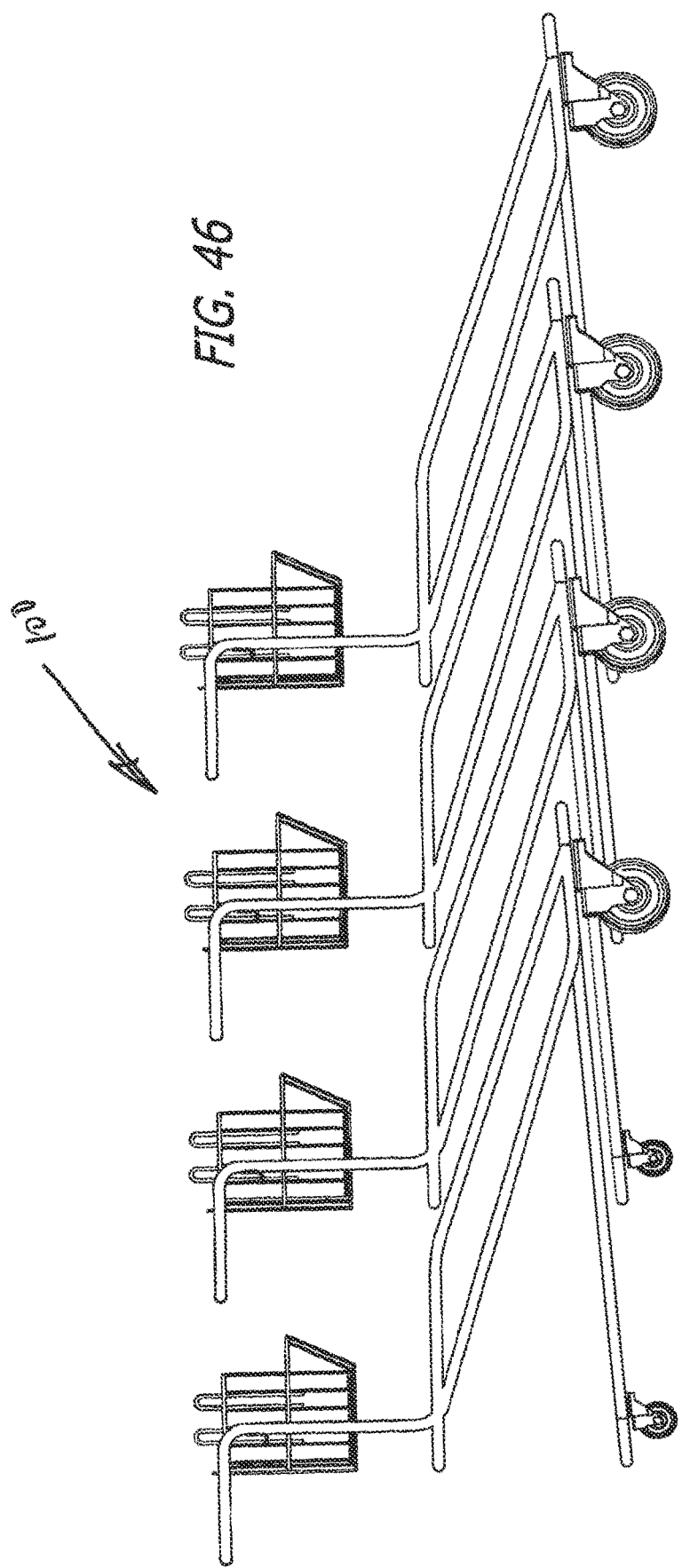
FIG. 46 is a side view of the cart shown in FIGS. 43, 44 and 45, this view showing how multiple carts stack together in telescoping fashion.
Figure 47:
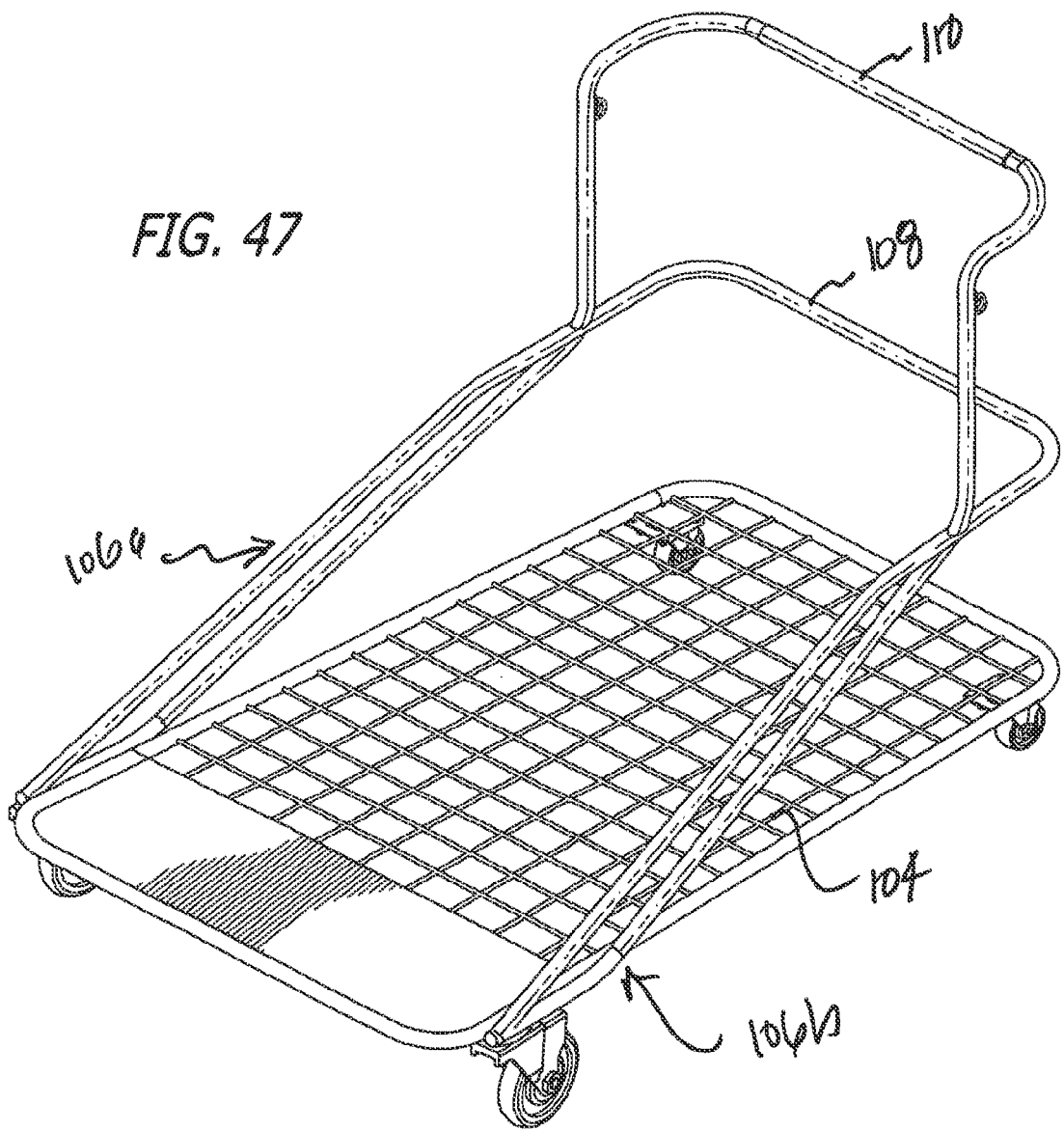
FIG. 47 is an isometric view showing the cart similar to that shown in FIGS. 39 to 46, but without any basket attached.

FIGS. 43 to 45 show a similar cart, but with a different basket 118. As this clearly shows, any suitable size and shape basket that will fit within the struts 106 can be utilized. FIG. 46 shows this embodiment of the cart in a multiple-cart nested arrangement. FIG. 47 shows a similar cart 100, but without any basket.

In all of the preferred embodiments shown, the front wheels are not only located "outside" the track of the rear wheels and "outside" the width of the rear portion of the bottom shelf frame, the front wheels are also larger in diameter than the rear wheels. This raises the front of the bottom base (shelf) frame to an elevation that is higher than the rear of the bottom base (shelf) frame. In one embodiment, the base frame is 3 inches above ground in the front, and only 1 inch above ground in the rear. This is not the only arrangement possible, and many difference arrangements and dimensions are possible.

Therefore, in the stacking or nesting operation, the front wheels and the front bottom shelf frame slide easily over and outside of the frame and rear wheels of the cart into which the first cart is being inserted. This provides for much easier stacking, which is not only more convenient for the person doing the stacking, but also helps reduce damage to the carts from the stacking operation. As is often seen, the stacking operation for traditional carts can sometimes require a significant force that can damage the cart.

The child seat portion of the cart has been designed in some embodiments to be safer and more comfortable than in the traditional cart. The openings in the carts rear panel for the child's legs are larger than typical, and have rounded edges for comfort. A child restraining belt (not shown) can be attached to either side of the cart, and each belt can connect to a buckle that extends upwardly between the child's legs. The potential for a momentarily unattended child standing up in the cart (and maybe falling out) is significantly reduced if not eliminated.

On the side portions of the basket, see-through sleeves (not shown) can be added into which advertising or other informational messages can be includes.

Figure 49:
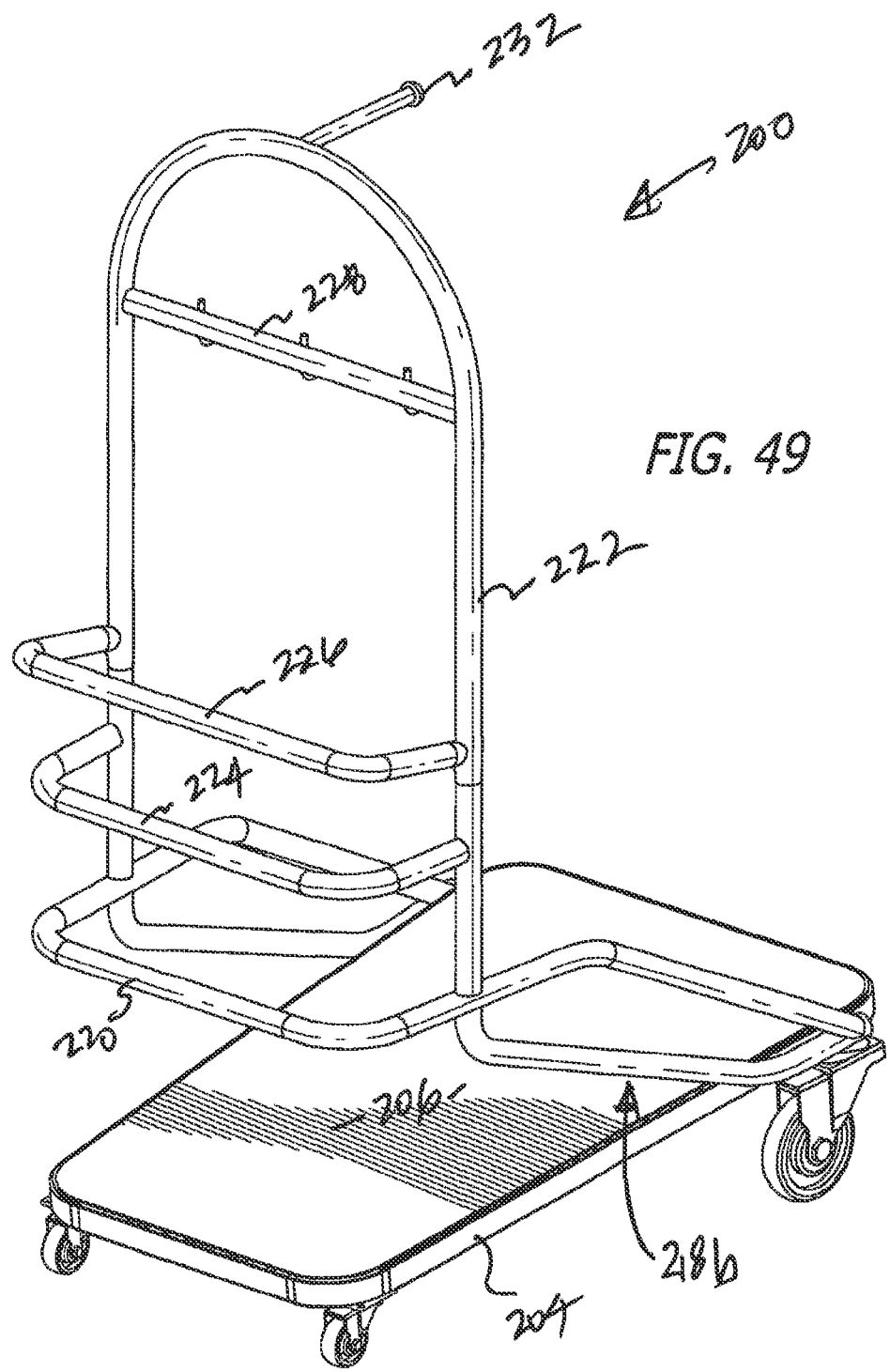
FIG. 49 is another isometric of the cart shown in FIGS. 48.
Figure 50:
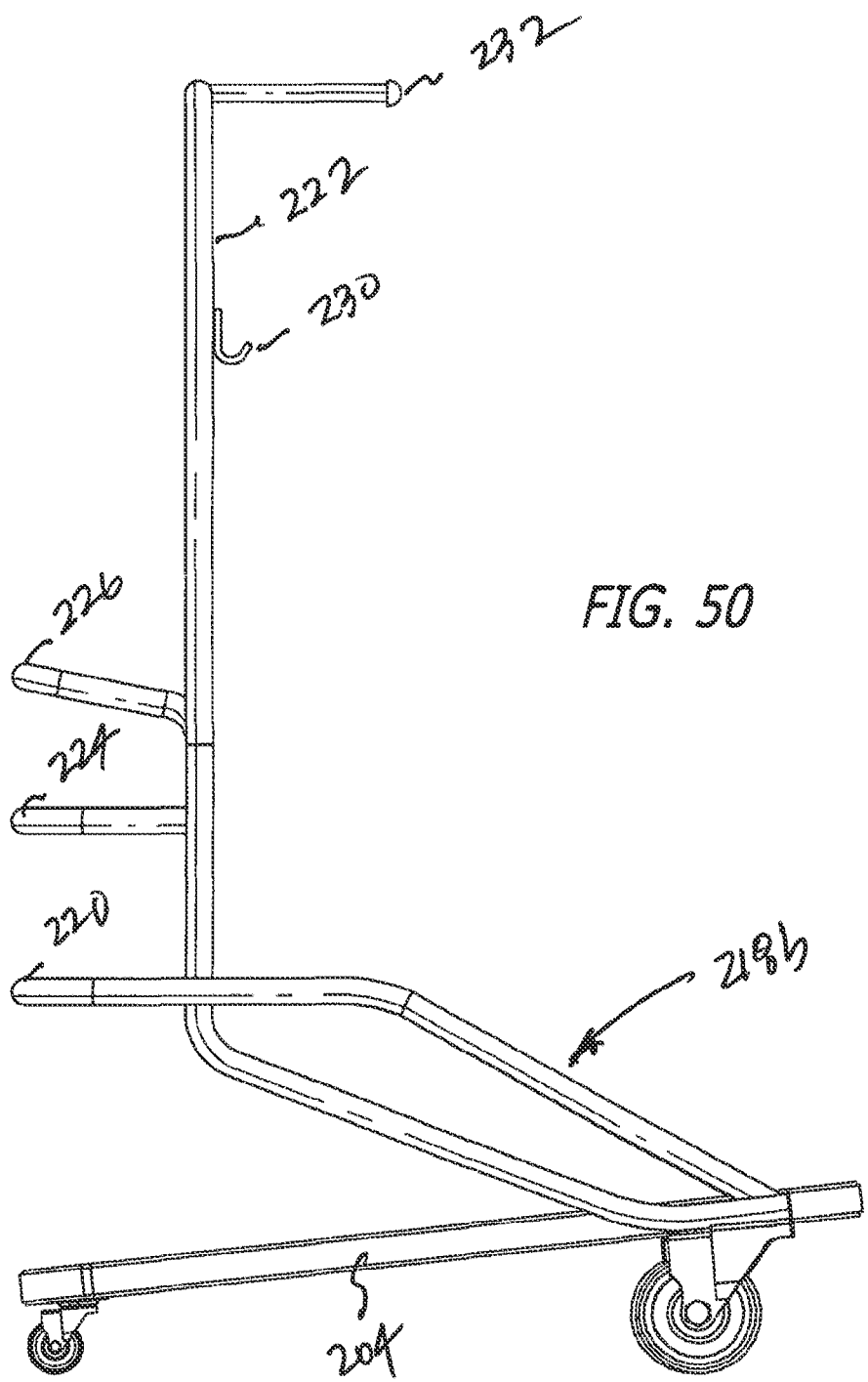
FIG. 50 is a side view of the cart shown in FIGS. 48 and 49.
Figure 51:
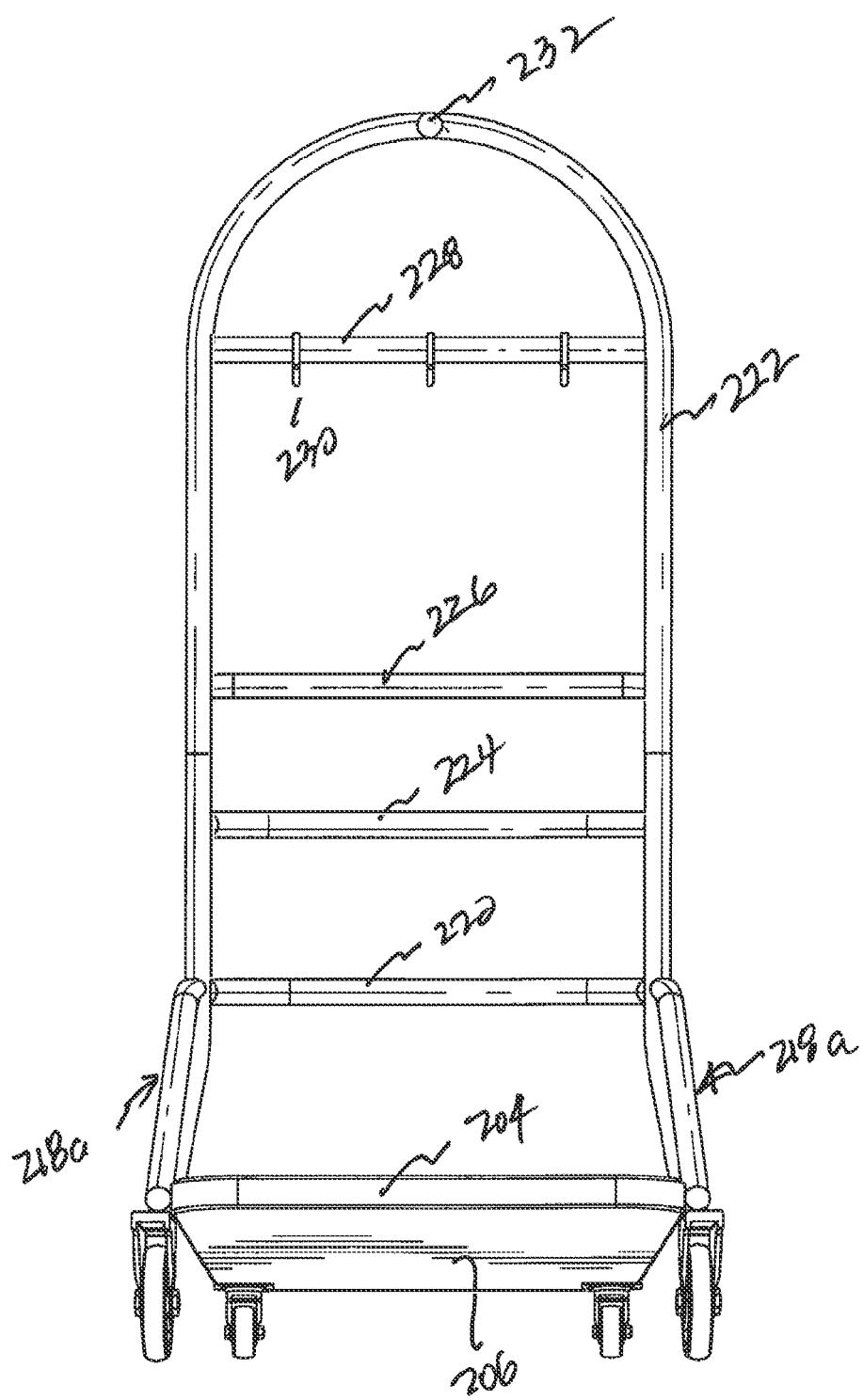
FIG. 51 is a side view of the cart shown in FIGS. 48 and 49.
Figure 52:
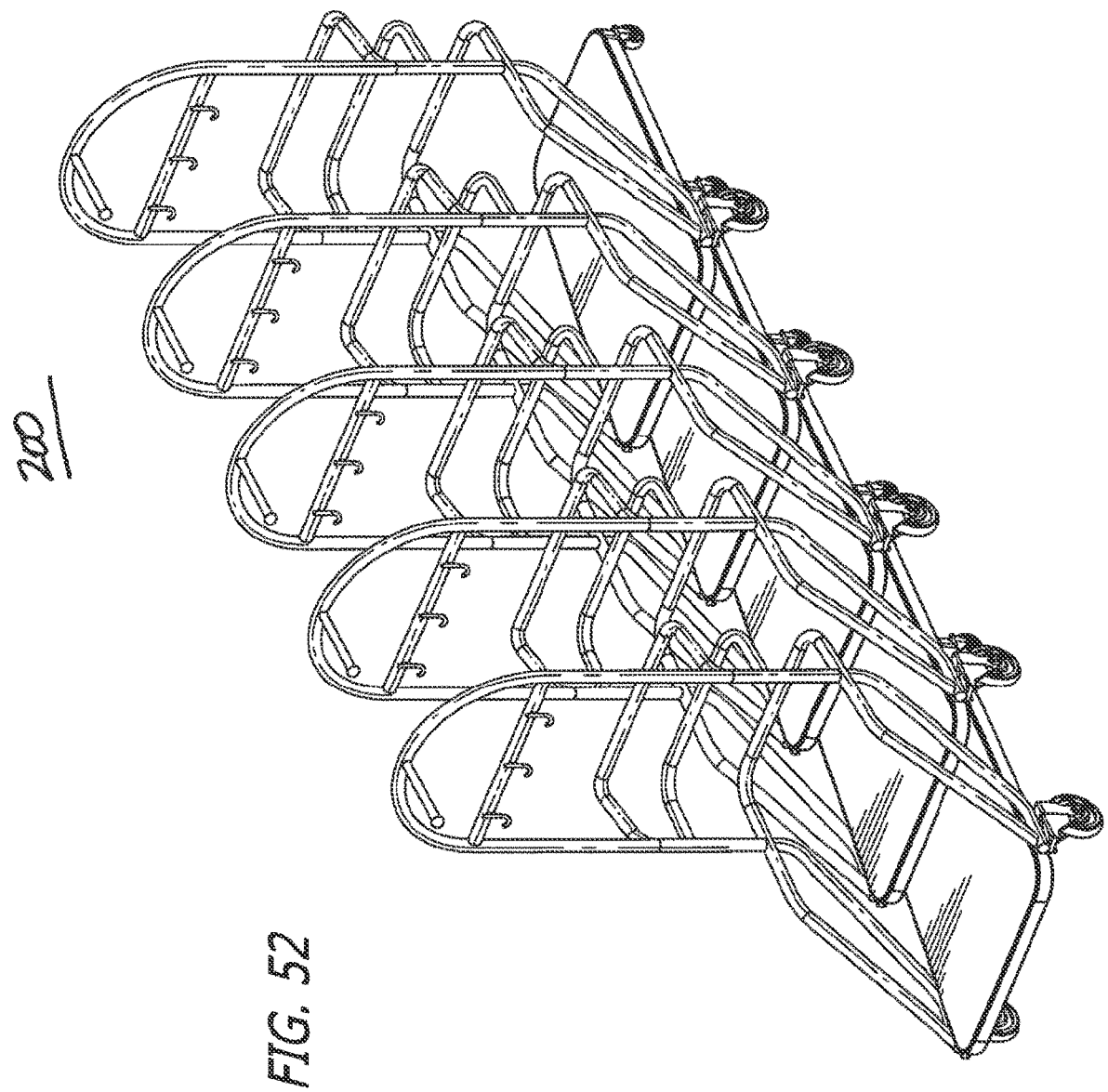
FIG. 52 is a isometric view of the cart shown in FIGS. 48 to 51, this view showing how multiple carts stack together in telescoping fashion.
Figure 53:
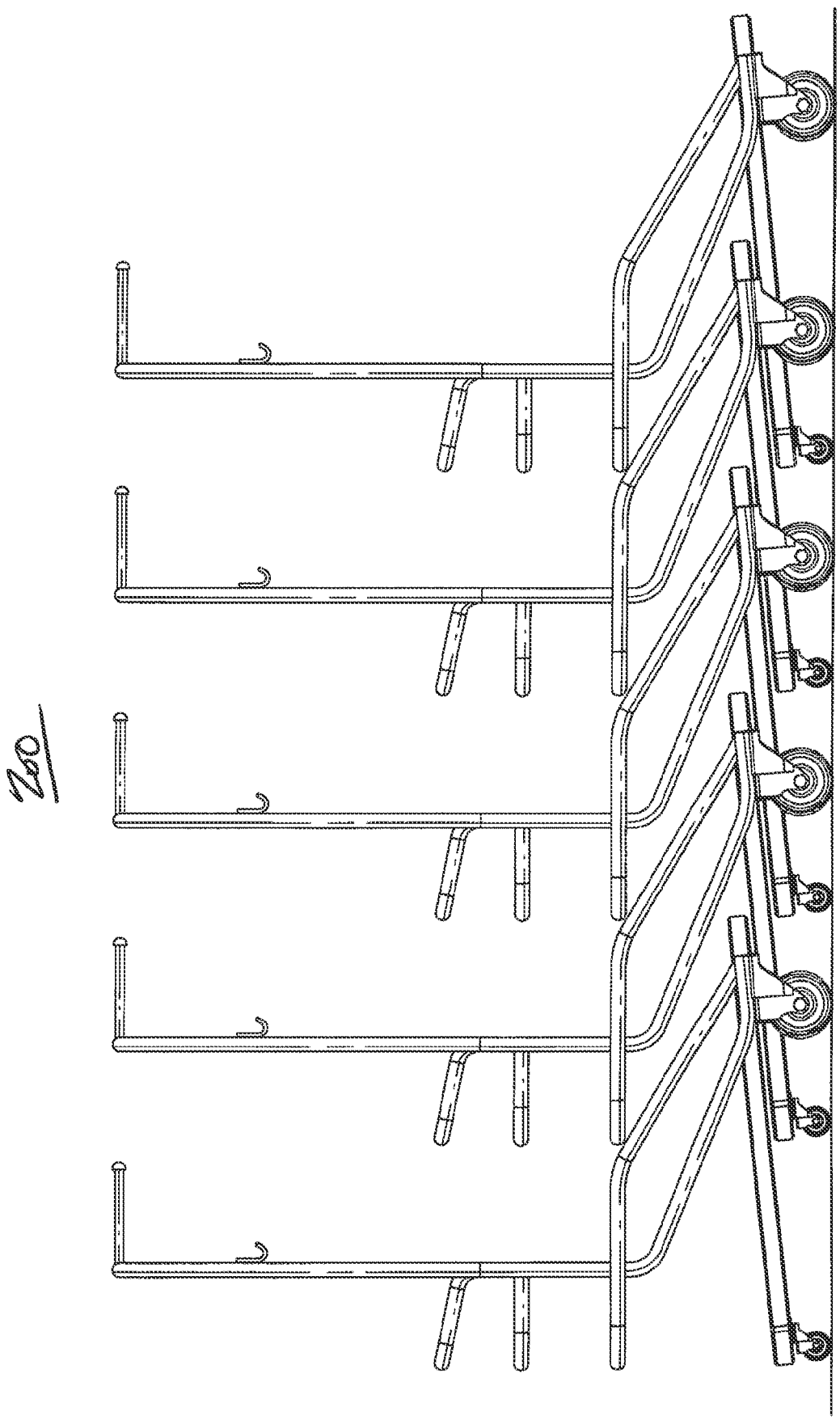
FIG. 53 is a side view of the cart shown in FIGS. 48 to 51, this view also showing how multiple carts stack or nest together in telescoping fashion.

FIGS. 48 to 53 show a fully-nesting hotel-type luggage cart 200 in which there is a base 202 that includes a base frame 204 and full, solid-piece floor board 206. In this embodiment, the base frame 204 and the floor board 206 are rectangular. As will we appreciated, other shapes can be used. A pair side flanges 208a and 208b are securely attached to the base frame 204 near the front of the cart 200, and extend laterally outward from the base frame 204 to a position that is wider than the rear portion of the base frame 204. As best seen in FIG. 51, a pair of front wheels 210a and 210b are attached respectively to the bottom of side flanges 208a and 208b, and a pair of rear wheels 212a and 212b are respectively attached to the base frame 204 itself at or near the rear corners of the base frame 204. As also best seen in FIG. 51, this arrangement provides that the distance between the inside rims of the front wheels 210a and 210b is greater than the distance between the outside rims of rear wheels 212a and 212b. This differential distances allows the front wheels 210a and 210b to be able to travel unrestrictedly past the rear wheels 212a and 212b thereby allowing multiple carts 200 to nest together in telescoping fashion as shown in FIG. 52.

In order for the carts 200 to be able properly nest in telescoping fashion, the front and rear portions of the base 202 must have a height differential. As best seen in FIG. 50, rear wheels 212a and 212b are smaller in diameter than front wheels 210a and 210b. This size differential results in the base 202 being slanted upward toward the front of the cart 200 a sufficient amount such that the bottom portion 214 of the base 202 at the front of the cart 200 is higher than the top portion 216 at the rear of the cart 200. This allows the front portion of base 202 of the cart 200 to slide over the top of the rear portion of base 202 of a similar cart thereby allowing the cart to nest together in telescoping fashion. This height differential can of course be accomplished by other suitable means, and does not need to be done using wheels of different diameters. Also, it is preferred that at least one set of the wheels is rotatable around their vertical axis, and both sets can be made to do so if that is desired.

Figure 48:
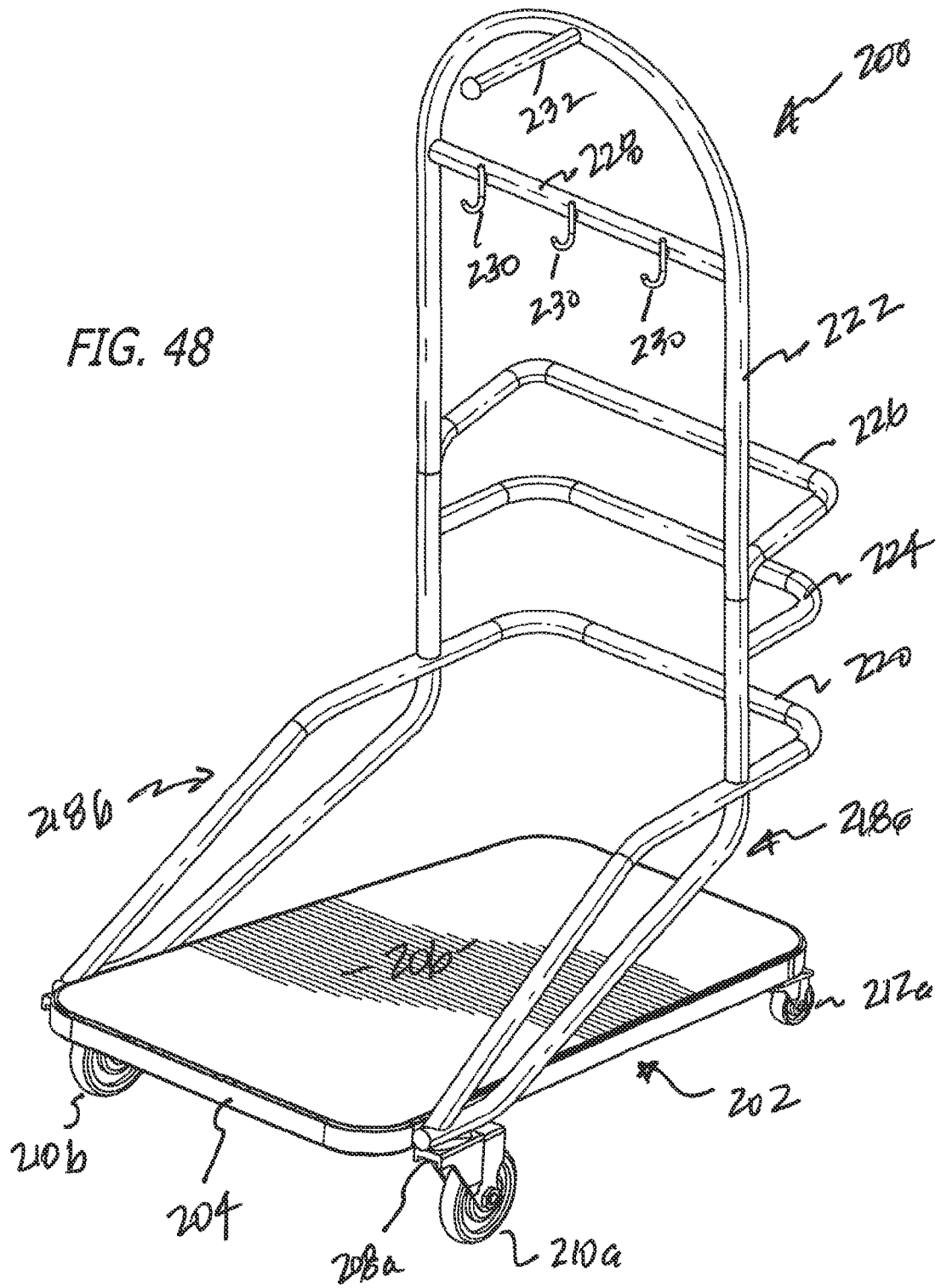
FIG. 48 is an isometric view of a type of stackable cart that would be useful as a hotel luggage cart, and provides a cart of similar utility and payload space as the conventional flat-bottom hotel luggage cart, but one that is fully stackable so as to take up much less storage and floor space when not in use.

As best seen in FIGS. 48 and 49, in this embodiment of the luggage cart, a pair of struts 218a and 218b, each comprising a part of strut legs 220a and 220b, are securely attached to the top of side flanges 208a and 208b which are located at or near the front of the base 202. The struts 218a and 218b do not need to have two legs and can be of any material and component(s) that provide for sufficient structure rigidity. The struts 218a and 218b extend upward diagonally toward the rear of the cart 200, leaving a significant area of the base 202 free of any structure that might preclude proper nesting.

As best seen in FIGS. 48, 49 and 50, the legs 220a and 220b of struts 218a and 218b also form a structure at the rear of the cart which comprises cross-member 220 and hoop member 222. U-shaped members 224 and 226 extend rearwardly from the hoop member 222. These U-shaped members can act as the handle for the person using the cart 200, and can also be used to store luggage and other personal items. A cross bar 228 having hooks 230 extends between the two vertical portion of hoop member 222 to provide additional storage capability, as does rod 232 that extends inwardly toward the front of the cart 200.

As will be appreciated from this description, this luggage cart will provide all of the storage and stacking capability of the traditional hotel-type luggage cart, but in a fully-nesting design.

Other components, combinations of components, features, functions and benefits will be apparent to those of skill in the art from the above descriptions and the attached Figures, and many modifications to the components and their arrangement in the embodiments shown above are possible without departing or deviating from the inventive concepts and inventions set forth in the following claims.

We claim:

1. A cart for transporting cargo, comprising:
   a) a frame having at least a front portion and a rear portion;
   b) a substantially flat platform attached to said frame, which together with said frame comprise a base frame structure having a front portion, a rear portion and side portions; said front portion and said rear portion each having a top and a bottom;
   c) at least 4 wheels attached to said base structure and extending downwardly for contact with the ground or other surface over which the cart travels when the cart is in use, said wheels each having a lateral inside edge and a lateral outside edge defined by the lateral width of said wheels and not their respective circumferences;
   d) two of said wheels being front wheels attached in proximity to the frontward portion of said base frame structure, wherein said two front wheels are in substantial lateral side-by-side alignment when viewed from the side, said front wheels having a lateral distance between their respective inside edges;
   e) two of said wheels being rear wheels attached in proximity to said rear portion of said base frame structure, wherein said two rear wheels are in substantial lateral side-by-side alignment when viewed from the side, said rear wheels having a lateral distance between their respective outside edges;
   f) the arrangement, placement, size and shape of said front wheels and said rear wheels being such that said lateral distance between said inside edges of said front wheels is greater than said lateral distance between said outside edges of said rear wheels; and
   g) said front portion of said base frame structure is higher relative to said rear portion of said base frame structure such that when the cart is in use the base frame structure is slanted downwardly, relative to said surface, a sufficient amount such that said bottom portion of said front portion is higher, relative to said surface, than is the top portion of said rear portion.

2. The cart according to claim 1 wherein said front portion of said base frame structure of one such cart can slide over said rear portion of said base frame structure of a second such cart at least one-third the longitudinal length of said base frame structure to allow for nesting of multiple such carts in telescoping fashion.

3. The cart according to claim 1 including at least one support strut attached in proximity to said front portion of said base frame structure and extending upwardly and rearwardly therefrom; and a basket-like structure having a front portion and a rear portion to which said support strut is attached in proximity to said rear portion to hold said basket-like structure in substantially rigid alignment relative to said base from structure.

4. The cart according to claim 1 in which there are two support struts, one on either side of the cart.

5. The cart according to claim 2 in which there are two support struts, one on either side of the cart.

6. The cart according to claim 2 in which said basket-like structure has a size and shape such that the front portion is sufficiently smaller than the rear portion such that the exterior dimensions of said front portion are less than the exterior dimensions of said rear portion, thereby allowing said front portion of one such cart to fit into the rear portion of a second such cart in telescoping fashion.

7. The cart according to claim 1 including a handle structure attached to said base frame structure and extending in a rearward direction to be used by the user of the cart to push and control the direction of travel of the cart.

8. The cart according to claim 3 including a handle structure attached to said basket and extending in a rearward direction to be used by the user of the cart to push and control the direction of travel of the cart.

9. The cart according to claim 7 in which a basket-like structure is attached to said handle structure.

10. The cart according to claim 7 in which said handle structure has a rotatable section which can be rotated to difference positions by the user of the cart.

11. The cart according to claim 1 in which an upwardly extending structure on which garment bags, purses, brief cases, and the like can be hung is attached to said rear portion of said base frame structure.

12. The cart according to claim 11 in which said upwardly extending structure is sized and shaped such that said structure on one such cart can fit in close proximity to the similar structure on a second such cart when the carts are nested in a telescoping fashion.

\* \* \* \* \*